(12) United States Patent
Sugimura et al.

(10) Patent No.: US 10,339,418 B2
(45) Date of Patent: Jul. 2, 2019

(54) COMPUTER-READABLE STORAGE MEDIUM STORING IMAGE PROCESSING PROGRAM AND IMAGE PROCESSING APPARATUS

(71) Applicant: FUJITSU LIMITED, Kawasaki-shi, Kanagawa (JP)

(72) Inventors: Masahiko Sugimura, Kawasaki (JP); Masaki Ishihara, Kawasaki (JP); Susumu Endo, Kawasaki (JP); Hiroaki Takebe, Kawasaki (JP); Takayuki Baba, Kawasaki (JP); Yusuke Uehara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 33 days.

(21) Appl. No.: 15/704,787

(22) Filed: Sep. 14, 2017

(65) Prior Publication Data
US 2018/0005080 A1    Jan. 4, 2018

Related U.S. Application Data

(63) Continuation of application No. PCT/JP2015/078027, filed on Oct. 2, 2015.

(51) Int. Cl.
*G06K 9/00* (2006.01)
*G06K 9/62* (2006.01)
*G06K 9/20* (2006.01)
*G06K 9/46* (2006.01)

(52) U.S. Cl.
CPC ......... *G06K 9/6212* (2013.01); *G06K 9/2054* (2013.01); *G06K 9/4642* (2013.01); *G06K 9/4661* (2013.01); *G06K 2009/4666* (2013.01)

(58) Field of Classification Search
None
See application file for complete search history.

(56) References Cited

U.S. PATENT DOCUMENTS 8,594,432 B2 * 11/2013 Yamamoto ........... G06K 9/4604
358/1.9
2006/0110029 A1 * 5/2006 Kazui ................ G06K 9/00228
382/159

(Continued)

FOREIGN PATENT DOCUMENTS

EP    2333718 A1    6/2011
EP    2919149 A2    9/2015

(Continued)

OTHER PUBLICATIONS

M. Calonder et al., "BRIEF: Binary Robust Independent Elementary Features", In Proceedings of the 11th European Conference on Computer Vision (ECCV), part IV, pp. 1-14, Sep. 2010, and Bibliographic page.

(Continued)

*Primary Examiner* — Soo Jin Park
(74) *Attorney, Agent, or Firm* — Staas & Halsey LLP

(57) ABSTRACT

A computation unit calculates luminance differences of individual pixel pairs in a feature area and calculates, based thereon, a local feature value formed from bit values respectively corresponding to the pixel pairs. Specifically, the computation unit calculates a specific luminance difference for a specific pixel pair corresponding to a specific bit value and then compares the result with a specified range including a zero point of luminance difference. Then a first value is assigned to the specific bit value when the specific luminance difference is greater than the upper bound of the specified range. A second value is assigned to the same when the specific luminance difference is smaller than the lower bound of the specified range. A predetermined one of the first and second values is assigned to the same when the specific luminance difference falls in the specified range.

5 Claims, 22 Drawing Sheets

(56) References Cited

U.S. PATENT DOCUMENTS

| | | | |
|---|---|---|---|
| 2011/0135203 A1 | 6/2011 | Iwamoto et al. | |
| 2015/0262382 A1 | 9/2015 | Irie et al. | |
| 2018/0247152 A1* | 8/2018 | Sugimura | G06K 9/4671 |

FOREIGN PATENT DOCUMENTS

| | | |
|---|---|---|
| JP | 2015-36906 | 2/2015 |
| JP | 2015-36929 | 2/2015 |
| JP | 2015-41226 | 3/2015 |
| WO | 2010/087124 A1 | 8/2010 |

OTHER PUBLICATIONS

H. Bay et al., "SURF: Speeded Up Robust Features", In Proceedings of the European Conference on Computer Vision (ECCV), part I, pp. 404-417, May 2006.

David G. Lowe, "Distinctive Image Features from Scale-Invariant Keypoints", International Journal of Computer Vision, vol. 60, Issue 2, pp. 91-110, Nov. 2004.

E. Rublee et al., "ORB: An efficient alternative to SIFT or SURF", In Proceedings of the International Conference on Computer Vision (ICCV), Nov. 2011, pp. 1-8 and Bibliographic pages (2).

A. Alahi et al., "FREAK: Fast Retina Keypoint", In Proceedings of the Conference on Computer Vision and Pattern Recognition (CVPR), Jun. 2012, pp. 1-8 and Bibliographic pages (2).

Japanese Platform for Patent Information English abstract for Japanese Patent Publication No. 2015-41226, published Mar. 2, 2015.

Japanese Platform for Patent Information English abstract for Japanese Patent Publication No. 2015-36906, published Feb. 23, 2015.

Japanese Platform for Patent Information English abstract for Japanese Patent Publication No. 2015-36929, published Feb. 23, 2015.

International Search Report dated Dec. 22, 2015, corresponding to International Patent Application No. PCT/JP2015/078027.

* cited by examiner

FIG. 4

112 PIXEL PAIR MANAGEMENT TABLE

| ID | PIXEL PAIR COORDINATES | |
|---|---|---|
| | FIRST PIXEL | SECOND PIXEL |
| 1 | (5, 4) | (30, 12) |
| 2 | (15, 7) | (20, 10) |
| 3 | (5, 22) | (10, 10) |
| 4 | (5, 15) | (5, 0) |
| ⋮ | ⋮ | ⋮ |
| M | (0, 5) | (10, 15) |

FIG. 17

112a PIXEL PAIR MANAGEMENT TABLE

| ID | PIXEL PAIRCOORDINATES | | THRESHOLD d |
| --- | --- | --- | --- |
| | FIRST PIXEL | SECOND PIXEL | |
| 1 | (5, 4) | (30, 12) | 0 |
| 2 | (15, 7) | (20, 10) | 3 |
| 3 | (5, 22) | (10, 10) | 0 |
| 4 | (5, 15) | (5, 0) | 0 |
| ⋮ | ⋮ | ⋮ | ⋮ |
| M | (0, 5) | (10, 15) | 5 |

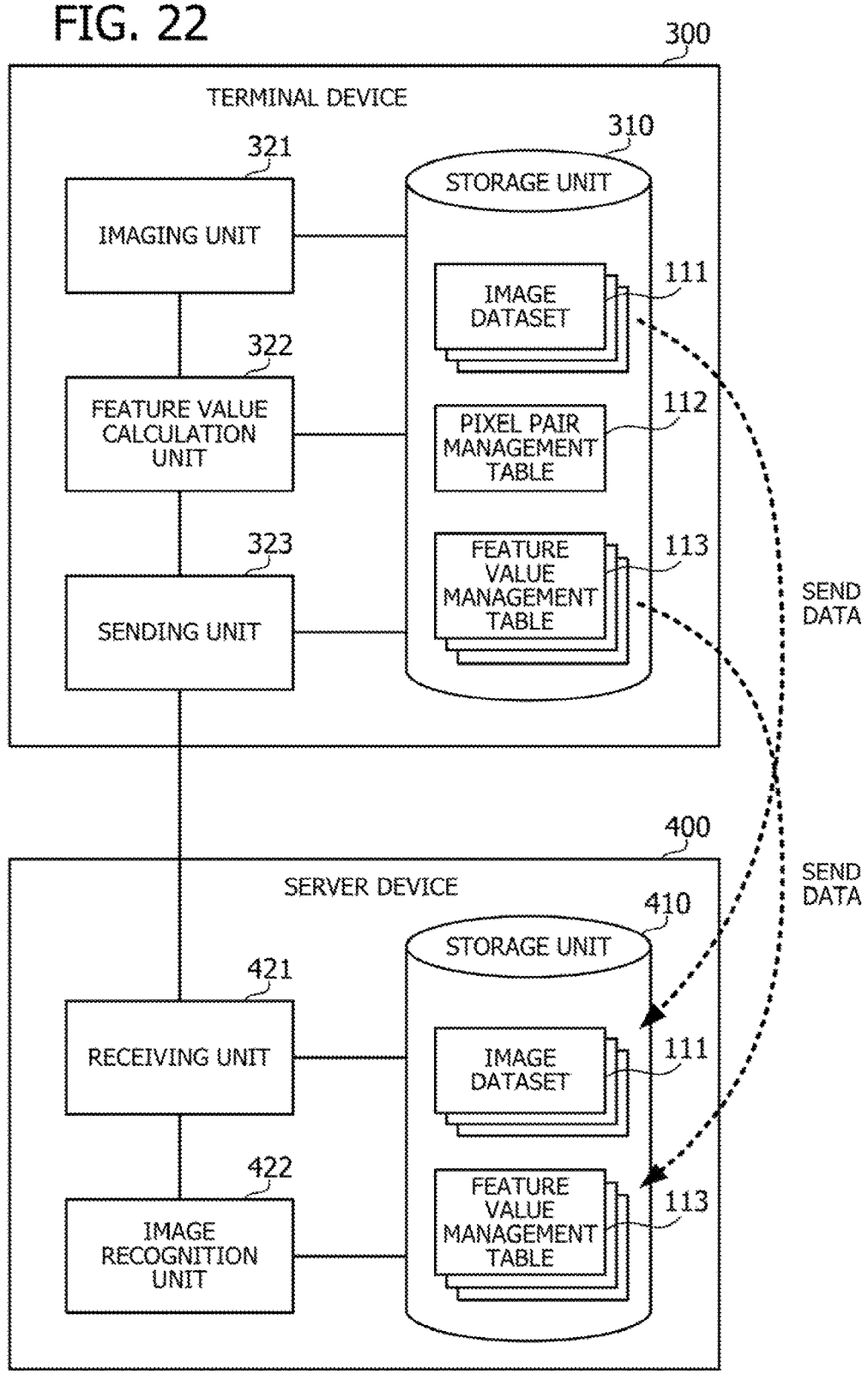

COMPUTER-READABLE STORAGE MEDIUM STORING IMAGE PROCESSING PROGRAM AND IMAGE PROCESSING APPARATUS

CROSS-REFERENCE TO RELATED APPLICATION

This application is a continuation application of International Application PCT/JP2015/078027 filed on Oct. 2, 2015 which designated the U.S., the entire contents of which are incorporated herein by reference.

FIELD

The embodiments discussed herein relate to a computer-readable storage medium storing an image processing program, as well as to an image processing apparatus.

BACKGROUND

Recent years have seen a growing use of image matching techniques in various application fields. For example, an image matching process analyzes first and second images by comparing local feature values at feature points in the first image with those in the second image and thereby discovering resembling feature points (referred to as "matching points") in the second picture. The resulting set of matching points is then subjected to statistical processes to detect presence and location of the first image in the second image.

Local feature values may be represented in the form of binary code to facilitate searching for matching points. Binary Robust Independent Elementary Features (BRIEF) is a representative example of such binary code. BRIEF describes local features on the basis of pixel-to-pixel luminance differences calculated for individual pixel pairs placed around a feature point. More specifically, BRIEF uses a set of bit values each corresponding to the sign (i.e., positive or negative) of a luminance difference between paired pixels. Local feature values are thus expressed in binary code form, and this method advantageously allows high-speed evaluation of similarity between feature points using Hamming distances. See, for example, the following documents:

Japanese Laid-open Patent Publication No. 2015-36906

M. Calonder, V. Lepetit, C. Strecha, and P. Fua., "BRIEF: Binary Robust Independent Elementary Features," In Proceedings of the European Conference on Computer Vision (ECCV), 2010

As described above, each bit of binary code may be calculated based on the sign of luminance differences of pixel pairs. However, this method has the following drawback. Suppose, for example, that some pixel pairs reside in flat and monotonous regions of a picture (e.g., the background area or monochromatic walls). These pixel pairs have almost no luminance difference because their pixels bear a close similarity in brightness. In such regions, the sign of luminance differences is easily reversed by a slight variation of light source intensity, noise disturbance, shooting angles, and the like, even though the imaging device is directed to the same part of the same object. Because of this uncertainty in local feature values, the aforementioned image mapping process would fail to detect in the second picture correct matching points corresponding to feature points in the first picture, thus leading to a poor accuracy of image recognition.

SUMMARY

In one aspect, there is provided a non-transitory computer-readable storage medium storing a program that causes a computer to perform a procedure including: calculating luminance differences of individual pixel pairs defined in a feature area in a source picture, the luminance differences each being a difference in luminance between pixels constituting a corresponding one of the pixel pairs; and calculating a local feature value of the feature area, based on the calculated luminance differences of the individual pixel pairs, the local feature value being a collection of bit values respectively corresponding to the individual pixel pairs. Here the calculating of a local feature value includes: comparing a specific luminance difference with a specified range between a lower bound and an upper bound, the specified range including a zero point of luminance difference, the specific luminance difference having been calculated for a specific pixel pair corresponding to a specific bit value in the local feature value; assigning a first value to the specific bit value when the specific luminance difference is greater than the upper bound of the specified range; assigning a second value to the specific bit value when the specific luminance difference is smaller than the lower bound of the specified range; and assigning a predetermined one of the first and second values to the specific bit value when the specific luminance difference falls in the specified range.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of a pixel pair management table;

FIG. 17 illustrates another example of a pixel pair management table;

FIG. 22 is a block diagram illustrating an example of processing functions provided by a terminal device and a server device.

DESCRIPTION OF EMBODIMENTS

Several embodiments will be described below with reference to the accompanying drawings.

(A) First Embodiment

Figure 1:
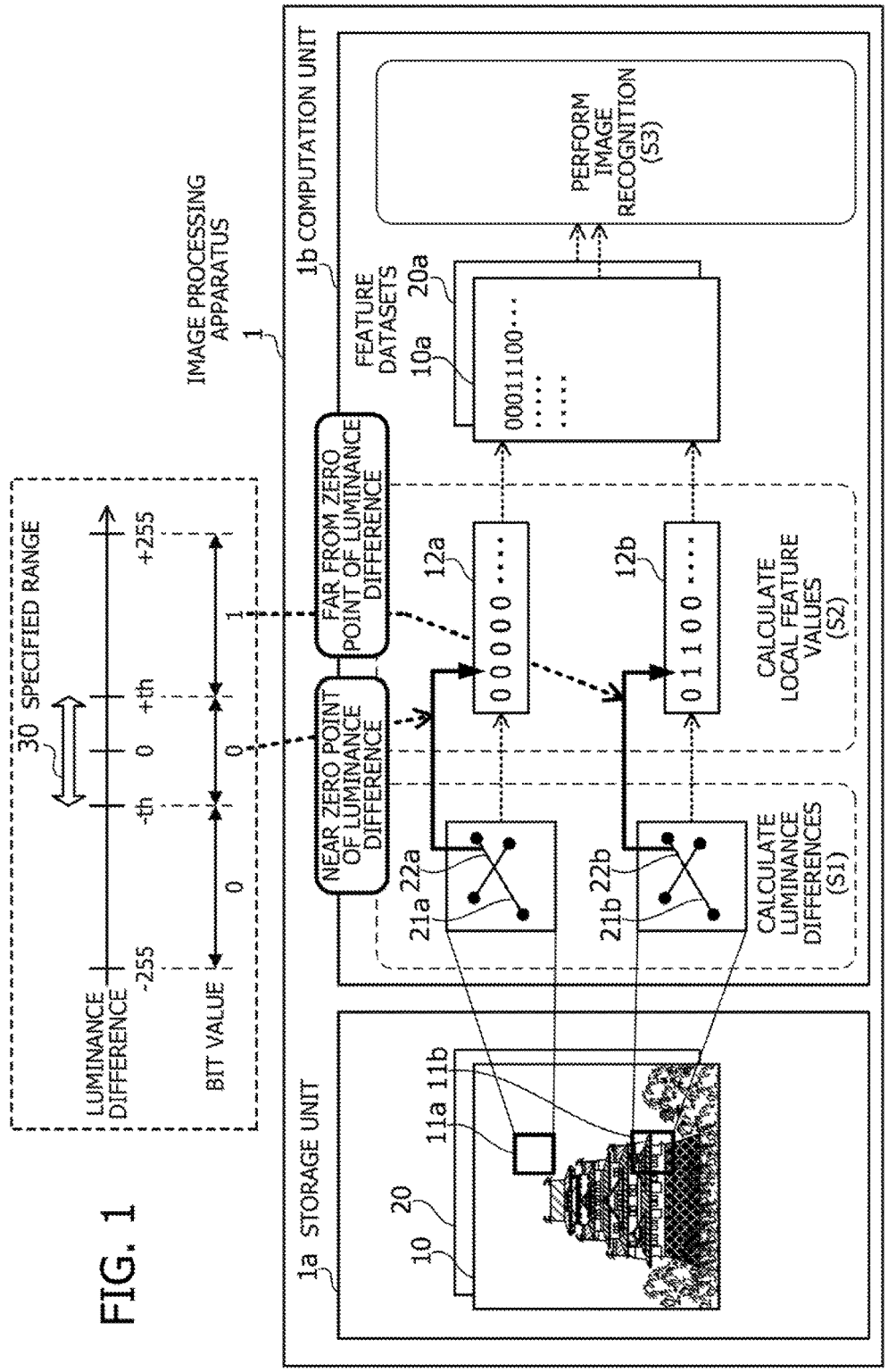
FIG. 1 illustrates an example of configuration of and processing by an image processing apparatus according to a first embodiment.

FIG. 1 illustrates an example of configuration, of and processing by an image processing apparatus according to a first embodiment. The illustrated image processing apparatus 1 includes a storage unit 1a and a computation unit 1b. The storage unit 1a may be implemented as part of, for example, a random access memory (RAM), a hard disk drive (HDD), or some other storage device. The computation unit 1b may be implemented as a processor, for example.

The storage unit 1a stores pictures including feature areas. For example, the storage unit 1a in FIG. 1 stores two pictures 10 and 20. Generally, pictures have two or more feature areas, and pixel pairs are placed in each feature area. Referring to the example in FIG. 1, one picture 10 has two feature areas 11a and 11b, and the former feature area 11a (referred to as the "first feature area") contains two pixel pairs 21a and 22a while the latter feature area 11b (referred to as the "second feature area") contains two pixel pairs 21b and 22b.

Every feature area has the same number of pixel pairs placed at the same relative locations. For example, a pixel pair 21a in the first feature area 11a sits at the same pixel positions as a pixel pair 21b in the second feature area 11b. Similarly, a pixel pair 22a in the first feature area 11a sits at the same pixel positions as a pixel pair 22b in the second feature area 11b.

The computation unit 1b calculates feature datasets that indicate features contained in pictures stored in the storage unit 1a. A feature dataset is actually a collection of local feature values calculated from each feature area in a picture. For example, feature datasets may be provided in the form of a table to hold information about local feature values calculated for individual feature areas. Referring to the example of FIG. 1, the computation unit 1b calculates a feature dataset 10a from one picture 10 (now referred to as the "first picture") and a feature dataset 20a from the other picture (referred to as the "second picture"). The former feature dataset 10a includes at least a local feature value 12a about the first feature area 11a and a local feature value 12b about the second feature area 11b.

The process of calculating feature datasets is formed from the steps of calculating luminance differences (step S1) and calculating local feature values (step S2). Specifically, step S1 calculates a difference in luminance between pixels constituting each pixel pair in feature areas. Step S2 calculates a local feature value of each feature area. Local feature values are each represented as a string of bits corresponding to different pixel pairs within a feature area. For example, BRIEF, Oriented FAST and Rotated BRIEF (ORB), Binary Robust Invariant Scalable Keypoints (BRISK), and other feature values may be represented in such bit string form.

The computation unit 1b determines each bit value constituting a local feature value by comparing a luminance difference of a corresponding pixel pair with a specified range 30. The specified range 30 is a range of luminance difference, including the zero-valued luminance difference. Specifically, the specified range 30 may be defined between −th and +th as in the example seen in FIG. 1, where the symbol th is a specific threshold.

More specifically, the computation unit 1b selects a bit value of "0" or "1" according to the conditions described below. That is, the computation unit 1b assigns a first value (e.g., "1" in the example of FIG. 1) to a pixel pair when the luminance different of that pixel pair exceeds the upper bound of the specified range 30. The computation unit 1b assigns a second value (e.g., "0" in the example of FIG. 1) to a pixel pair when the luminance different of that pixel pair is below the lower bound of the specified range 30. The computation unit 1b assigns either the first value or second value (e.g., "0" in the example of FIG. 1) to a pixel pair when the luminance different of that pixel pair falls within the specified range 30.

The computation unit 1b calculates local feature values of individual feature areas in the first picture 10 in the way described above and compiles the results into a feature dataset 10a. The computation unit 1b also calculates the same in the second picture 20 and compiles the results into another feature dataset 20a.

The computation unit 1b subsequently executes an image recognition process with the above feature datasets 10a and 20a (step S3). This image recognition process includes at least a sub-process that identifies matching areas, out of the feature areas in the second picture 20, that resemble some feature areas in the first picture 10. The noted sub-process evaluates the similarity between two feature areas by comparing their local feature values with each other. For example, the similarity between feature areas is measured on the basis of Hamming distance between their corresponding local feature values. Using the calculated similarity of feature areas between the first and second pictures 10 and 20, the computation unit 1b is able to, for example, determine whether the second picture 20 has any image area that resembles the first picture 10. The above-described image recognition process may be executed by an apparatus other than the image processing apparatus 1.

The bit values constituting a local feature value may be determined on the basis of the sign of luminance differences of corresponding pixel pairs (i.e., depending on whether each difference is positive or negative). For example, a pixel pair is given a bit value of "1" when its luminance difference is greater than zero, and a bit value of "0" when its luminance difference is zero or below. However, this sign-based method may fail to correctly determine the similarity between feature areas when their pixel pairs are located in a flat region of the picture. That is, the sign-based method allows bit values to fluctuate even with a slight variation of light source intensity or noise disturbance, thus worsening the accuracy of similarity evaluation.

Referring again to the example of FIG. 1, the first feature area 11a appears flat and monotonous, whereas the second feature area 11b is not flat or monotonous, but contains high-contrast images. Accordingly, the pixel pairs in the first feature area 11a have little difference in luminance. In this situation, even a small variation in light source intensity or noise disturbance would affect the luminance difference of a pixel pairs. That is, the luminance difference may easily change from positive to negative or from negative to positive. The similarity between feature areas could be determined by comparing their respective local feature values calculated with the above sign-based method, but this approach does not always end up with successful results because of the possibility of undervaluing the similarity.

In view of the above, the present embodiment configures its computation unit 1b to output a predetermined bit value, 0 or 1, for pixel pairs whose luminance differences fall within a specified range 30. This approach ensures that pixel pairs in a near-zero range of luminance difference will have a fixed bit value of "0" or "1" regardless of variations of light source intensity and noise disturbance. The resulting feature values will enable correct determination of matching areas.

Figure 11:
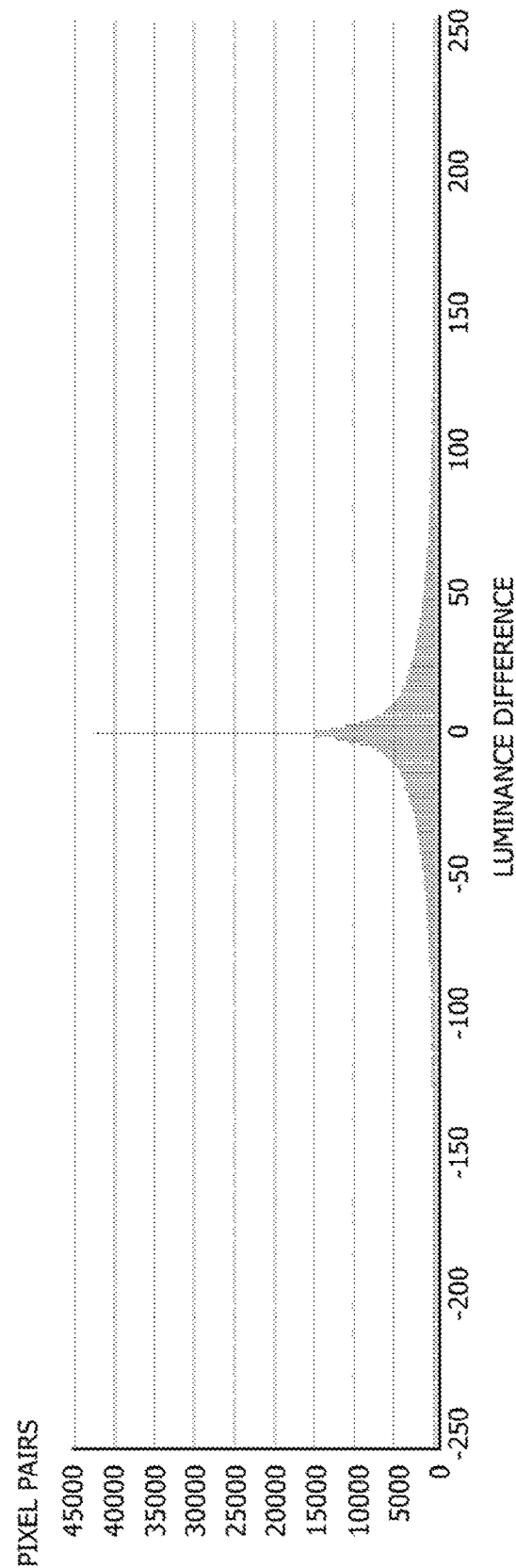
FIG. 11 illustrates an example of a histogram of luminance differences between paired pixels.

In the example of FIG. 1, the luminance difference of a pixel pair 22b in the second feature area 11b is out of the specified range 30 and thus deemed to be far from the zero luminance point. In this case, the sign-based method may safely be used to determine the bit value for the pixel pair 22b. The pixel pair 22b in FIG. 11 is assigned a bit value of "1" because its luminance difference is above the specified range 30.

Unlike the above pixel pair 22b, the corresponding pixel pair 22a in the first feature area 11a has a luminance difference that falls in the specified range 30 and is thus deemed to be close to the zero point. Accordingly, the pixel pair 22a is given a fixed bit value, which is "0" in FIG. 1. The resulting local feature value 12a thus contributes to correct similarity evaluation.

(B) Second Embodiment

The description now describes an image processing apparatus according to a second embodiment. This image processing apparatus permits selection of a key picture from a set of source pictures and searches the rest of the source pictures for those containing images of a particular scene by evaluating resemblance to the key picture. The second embodiment assumes the user of BRIEF-based feature descriptors, but it is not intended to limit the scope of the second embodiment to that specific assumption. The second embodiment may use other binary feature descriptors (e.g., ORB, BRISK) obtained by binarizing luminance differences of pixel pairs around feature points.

Figure 2:
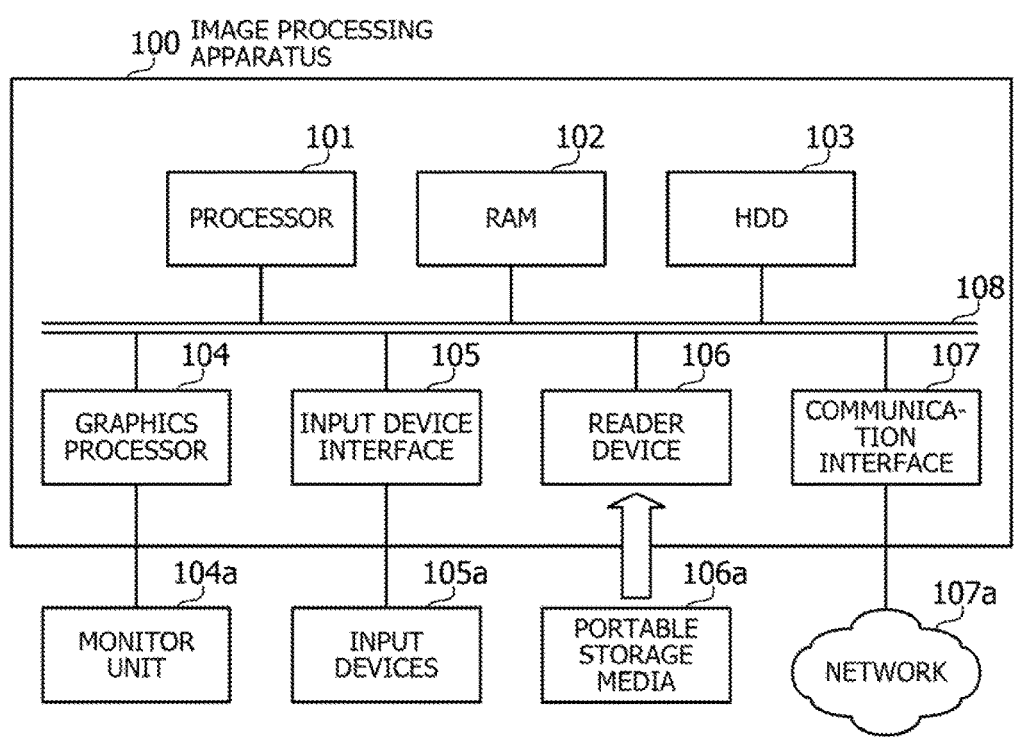
FIG. 2 illustrates an example of a hardware configuration of an image processing apparatus according to a second embodiment.

FIG. 2 illustrates an example of a hardware configuration of an image processing apparatus according to the second embodiment. The illustrated computer platform in FIG. 2 may be used to implement an image processing apparatus 100 according to the second embodiment.

This image processing apparatus 100 has a processor 101 to control its entire operation. The processor 101 may be a single processing device or a multiprocessor system including two or more processing devices. For example, the processor 101 may be a central processing unit (CPU), micro processing unit (MPU), digital signal processor (DSP), application specific integrated circuit (ASIC), or programmable logic device (PLD), or any combination of them.

The processor 101 is connected to a RAM 102 and other various peripheral devices and interfaces on a bus 108. The RAM 102 serves as the primary storage device in the image processing apparatus 100. Specifically, the RAM 102 is used to temporarily store at least some of the operating system (OS) programs and application programs that the processor 101 executes, as well as other various data objects that it manipulates at runtime.

Other devices on the bus 108 include an HDD 103, a graphics processor 104, an input device interface 105, a reader device 106, and a communication interface 107.

The HDD 103 serves as a secondary storage device of the image processing apparatus 100 to store OS program files and application program files, as well as various data files. Other possible secondary storage devices include solid state drives (SSD) using non-volatile memory devices.

The graphics processor 104, coupled to a monitor unit 104a, produces still or video images in accordance with drawing commands from the processor 101 and displays them on a screen of the monitor unit 104a. The monitor unit 104a may be a liquid crystal display or an organic electroluminescence (OEL) display.

The input device interface 105 is connected to input devices 105a, such as keyboards and pointing devices, and supplies signals from those devices to the processor 101. Pointing devices include a mouse, touchscreen, tablet, touchpad, and trackball.

The reader device 106 is an interface for portable storage media 106a, such as optical discs, magneto-optical discs, and semiconductor memory devices. Specifically, a portable storage medium 106a is attached to and detached from the reader device 106. The reader device 106 reads data from the attached portable storage medium 106a and sends it to the processor 101.

The communication interface 107 is connected to a network 107a to exchange data with other devices (not illustrated).

The above-described hardware platform may be used to implement the processing functions of the image processing apparatus 100.

The image processing apparatus 100 has a storage device (e.g., HDD 103) to store data of pictures that were photographed using imaging devices. For example, data of these pictures may have been loaded to the storage device by using portable storage media 106a or may have been sent to the image processing apparatus 100 over the network 107a.

The image processing apparatus 100 provides processing functions described below by executing, for example, photograph management software. Suppose now that the user has selected one of the pictures stored in a certain storage device of the image processing apparatus 100. The selected picture is referred to as a "key picture." In response, the image processing apparatus 100 searches the rest of the stored pictures to extract those containing a scene that resembles what is seen in the key picture. The pictures subjected to this similarity evaluation are referred to herein as "candidate pictures" since they will be evaluated as the candidates for matching pictures with respect to the key picture selected above. For example, the image processing apparatus 100 extracts a candidate picture when it is deemed to have an image of the same object as the key picture has and thus qualified as a matching picture that resembles the key picture in terms of scenes. This capability of the proposed image processing apparatus 100 provides the user with improved convenience and additional enjoyment. For example, the user may be able to extract desired pictures as a material for use in another project, or to collect and automatically manage photographs taken at a particular event.

The above-described image processing apparatus 100 may be implemented in the form of a user-operable terminal device, such as personal computers and smart phones. The image processing apparatus 100 may alternatively be implemented as a server device on a network. In this alternative case, picture datasets are uploaded from a user terminal device to the image processing apparatus 100 via the network.

The proposed image search functions of the image processing apparatus 100 may be used, not only for management of photographed pictures mentioned above, but also for management of presentation materials and other documentary content. For example, the image processing apparatus 100 may collect multiple document data instances in its storage device, and a key document is selected out of them. The image processing apparatus 100 may be able to extract documents containing sentences whose visual appearance resembles that of the key document, or to extract documents that contain identical images, tables, graphs, or the like as in the key document. These functions help the user find desired documents in a shorter time, besides promoting reuse of past document resources, and thus contribute to more efficient business activities.

The proposed image search functions of the image processing apparatus 100 may be used as additional features of a medical image management system. For example, the image processing apparatus 100 may store a time series of medical images, such as those obtained with computed tomography (CT) or magnetic resonance imaging (MRI). The image processing apparatus 100 automatically adjusts image alignment of the diseased part, so that the medical practitioners may see how the diseased part has changed its appearance with time.

Figure 3:
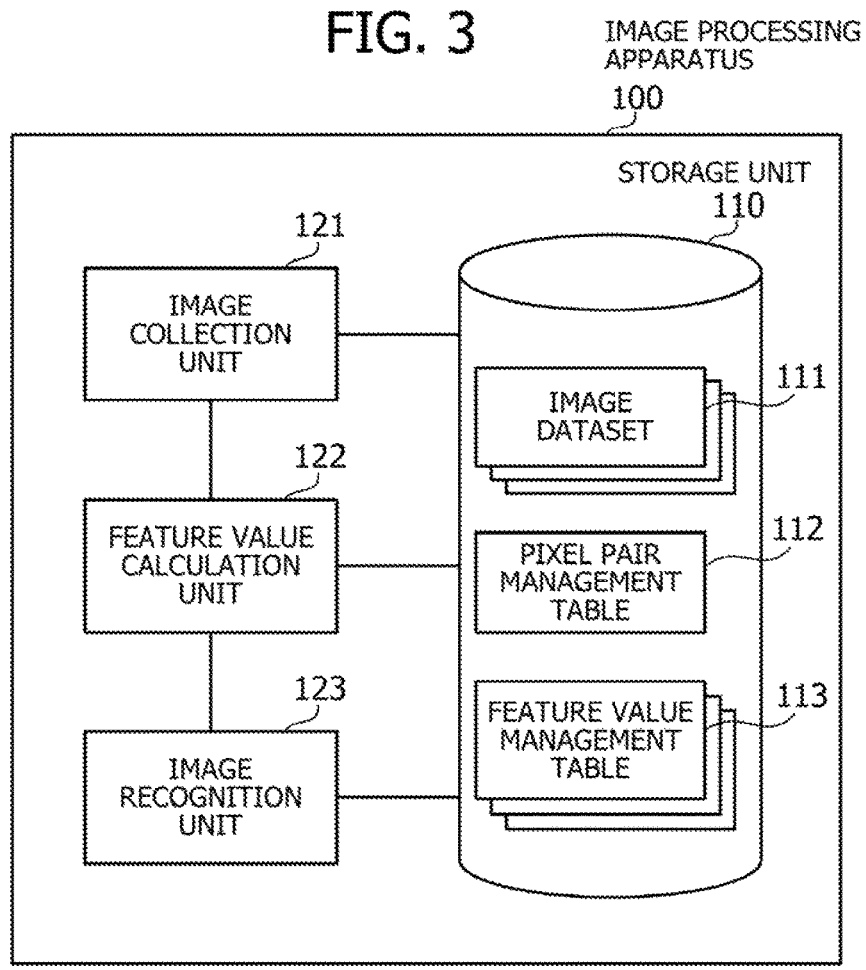
FIG. 3 is a block diagram illustrating an example of processing functions of an image processing apparatus.

FIG. 3 is a block diagram illustrating an example of processing functions of an image processing apparatus. The illustrated image processing apparatus 100 includes a storage unit 110, an image collection unit 121, a feature value calculation unit 122, and an image recognition unit 123.

The storage unit 110 is implemented as part of storage space of a storage device (e.g., RAM 102 or HDD 103) in the image processing apparatus 100. Specifically, the storage unit 110 stores therein image datasets 111, a pixel pair management table 112, and feature value management tables 113.

The image datasets 111 contain picture data captured with imaging devices. The storage unit 110 stores multiple such datasets. The pixel pair management table 112 is a set of registered records each including pixel pair coordinates (i.e., coordinates of two pixels constituting a pixel pair) used to calculate local feature values. The feature value management tables 113 have been prepared on an individual picture basis. Each feature value management table 113 has a set of registered records that describe local feature values of individual feature points in a picture.

The image collection unit 121, feature value calculation unit 122 and image recognition unit 123 provide processing functions described below. These functions may be implemented by, for example, causing the processor 101 to execute relevant programs.

The image collection unit 121 receives image datasets 111 of source pictures and stores them in the storage unit 110. For example, the image collection unit 121 receives image datasets 111 via portable storage media 106a or the network 107a.

The feature value calculation unit 122 calculates local feature values at individual feature points in a picture, with reference to the image datasets 111 and pixel pair management table 112. The feature value calculation unit 122 then populates a pertaining feature value management table 113 with the calculated local feature values.

The image recognition unit 123 accepts a selection of a key picture out of the stored source pictures. In response, the image recognition unit 123 searches the rest of the source pictures to find matching pictures that resemble the selected key picture, with reference to the feature value management tables 113.

a) Calculation of Feature Values

This section describes in detail a process of feature value calculation performed by the feature value calculation unit 122. The feature value calculation unit 122 defines feature points by placing a single pattern of points on each different picture. The present embodiment assumes the use of a dense sampling method for this purpose. For example, the feature value calculation unit 122 places feature points at equal grid intervals (e.g., at every 24 pixels in each direction). The feature value calculation unit 122 then calculates a local feature value at every feature point in each picture.

As noted earlier, the second embodiment calculates BRIEF as the local feature value of a fixed area surrounding a feature point. The noted area is referred to herein as a "feature area." Feature areas are each defined as a square area with dimensions of 48 pixels by 48 pixels, having a feature point at its center. Two or more pixel pairs are defined in each feature area. Specifically, the local feature value at a feature point is obtained by calculating luminance differences of individual pixel pairs in the corresponding feature area and combining the signs of these luminance differences into a single bit string.

FIG. 4 illustrates an example of a pixel pair management table. This pixel pair management table 112 is prepared for registration of coordinates of pixels constituting each pixel pair. Specifically, the pixel pair management table 112 is configured to record the coordinates of first and second pixels of each pixel pair, together with IDs that distinguish individual pixel pairs, as seen in FIG. 4. For example, the coordinates of these pixel pairs are determined in a random manner. The setup of pixel pairs defined in the pixel pair management table 112 is applied equally to every feature area.

Figure 5:
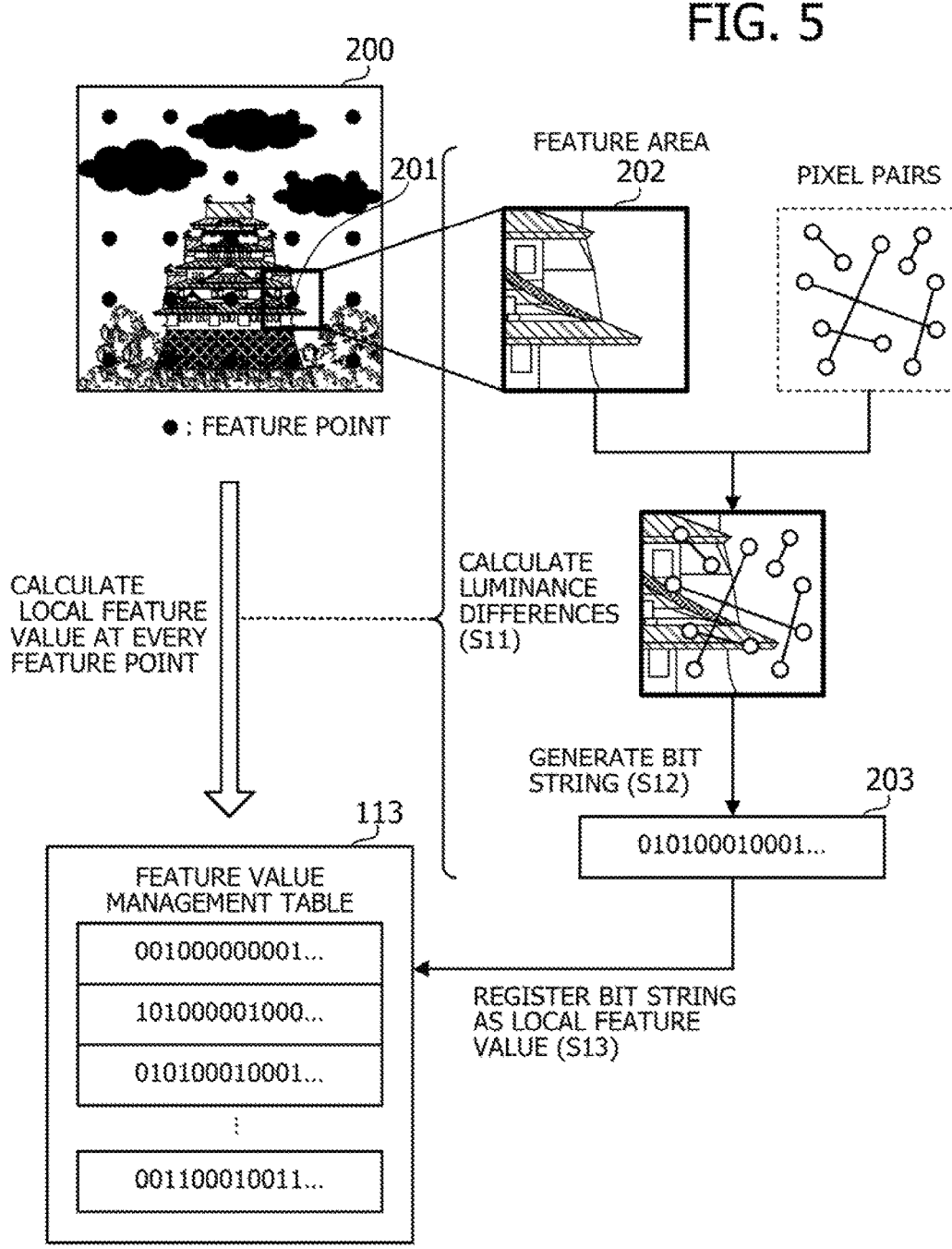
FIG. 5 illustrates an example of how to calculate local feature values.

FIG. 5 illustrates an example of how to calculate local feature values. The illustrated example demonstrates calculation of local feature values in a source picture 200 and their registration with a corresponding feature value management table 113.

Take a specific feature point 201 in the source picture 200, for example. The local feature value of this feature point 201 is calculated as follows. The feature value calculation unit 122 first calculates luminance differences of individual pixel pairs in a feature area 202 corresponding to the feature point 201 (step S11). For example, the feature value calculation unit 122 obtains first and second pixels of a pixel pair from the pixel pair management table 112 and calculates the luminance difference of that pixel pair by subtracting luminance at the second pixel from luminance at the first pixel.

The feature value calculation unit 122 then generates a bit string 203 by combining bit values that correspond to the signs of the luminance differences calculated above (step S12). Specifically, the feature value calculation unit 122 determines bit values in the defined order of pixel pairs and concatenates each determined bit value with preceding ones so as to form a bit string. For example, the bit string 203 may have a length of M bits when each feature area is configured to accommodate M pixel pairs. The feature value calculation unit 122 then registers the generated bit string 203 in a feature value management table 113 as a record representing the local feature value at the feature point 201 (step S13).

Step S12 could be implemented such that a pixel pair be assigned a bit value of "1" for positive luminance differences and "0" for negative luminance differences, or a bit value of "0" for positive luminance differences and "1" for negative luminance differences. Pictures may, however, have some sections with almost no luminance variations. The bit values in such flat sections may easily be affected by a small variation of imaging conditions, which results in a poor accuracy of image recognition. For these reasons, the present embodiment determines bit values with a shifted threshold away from the zero point of luminance differences, so that the resulting local feature values will improve the accuracy of image recognition. More details will be presented in later sections.

Figure 6:
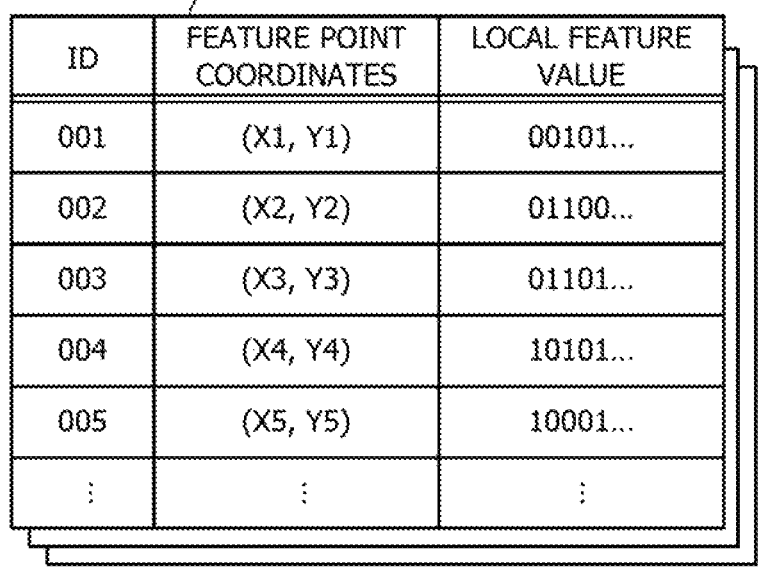
FIG. 6 illustrates an example of feature value management tables.

FIG. 6 illustrates an example of feature value management tables. As noted earlier, feature value management tables 113 are prepared on an individual picture basis.

Feature value management tables 113 are used to register records of feature points in each picture. Specifically, each record is formed from the data fields of ID, feature point coordinates, and local feature value as seen in FIG. 6. The ID field contains an identifier that distinguishes a specific feature point described by the record, and the feature point coordinates field indicates its coordinates. The local feature value field contains a bit string representing the local feature value at that feature point.

b) Image Recognition

This section of the description explains in detail a process of image recognition that the image recognition unit 123 performs. The image recognition unit 123 selects a key picture from the set of source pictures in response to instructions entered by the user. The image recognition unit 123 compares the selected key picture with each of the remaining source pictures (i.e., candidate pictures) so as to seek pictures that resemble the key picture.

The comparison of a key picture with candidate pictures includes a search for similar feature points in different pictures. In this search operation, the image recognition unit 123 calculates a Hamming distance between the local feature value at each feature point selected from the key picture and the local feature value at each feature point selected from a candidate picture. The image recognition unit 123 then determines which feature point has the smallest Hamming distance in the candidate picture and extracts the discovered feature point as a matching point that exhibits the closest resemblance.

The image recognition unit 123 now executes the following things for each individual feature point in the key picture. The image recognition unit 123 estimates where in the candidate picture the center of the key picture will come when the key picture is overlaid on the candidate picture in such a way that the feature point of interest coincides with its corresponding matching point in the candidate picture. The image recognition unit 123 then casts a vote for the candidate picture's pixel at the estimated central position. The image recognition unit 123 repeats these operations with respect to different feature points and determines which pixel in the candidate picture has the largest number of votes. If the number of votes exceeds a specified threshold, the image recognition unit 123 extracts the candidate picture as a matching picture of the key picture.

Figure 7:
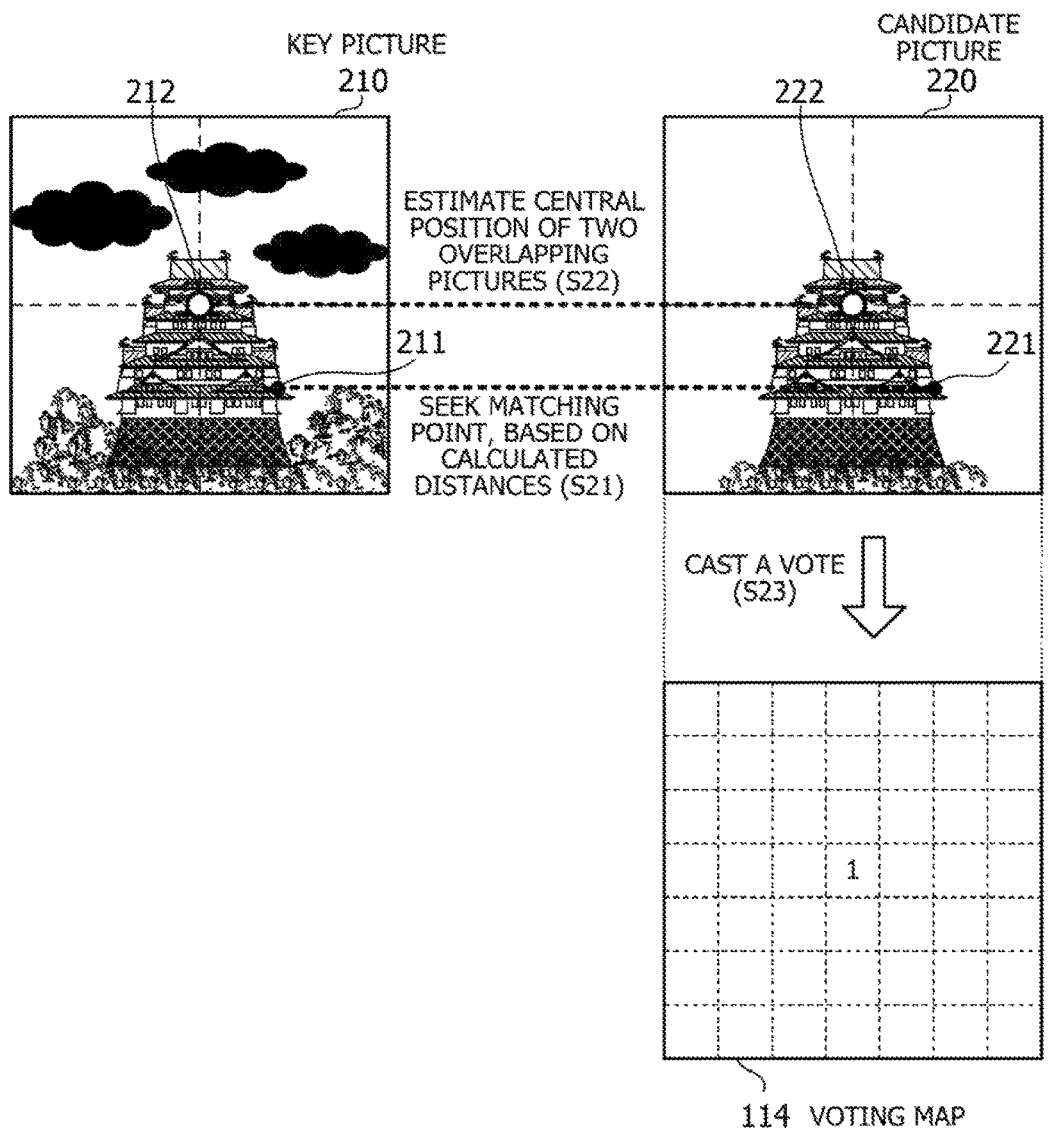
FIG. 7 explains voting operations.

FIG. 7 explains voting operations, in which the image recognition unit 123 looks for a matching point in a candidate picture 220 that corresponds to a feature point 211 in the key picture 210. For example, the image recognition unit 123 seeks a matching point on the basis of Hamming distance of local feature values between the feature point 211 in the key picture 210 and each feature point in the candidate picture 220 (step S21).

Suppose now that a specific feature point 221 is extracted from the candidate picture 220 as a matching point corresponding to the feature point 211 in the key picture 210. The image recognition unit 123 then estimates where in the candidate picture 220 the center position 212 of the key picture 210 will come when the key picture 210 is overlaid on the candidate picture 220 in such a way that the feature point 211 coincides with its corresponding feature point (matching point) 221 in the candidate picture 220 (step S22).

Let the symbols wi and hi represent the width and height of the candidate picture in units of pixels. Also let the symbols wr and hr represent the width and height of the key picture in units of pixels. Assuming that a feature point (xi, yi) is detected in the candidate picture as matching with a feature point (xr, yr) in the key picture, the central position of the key picture is mapped to (xv, yv) in the candidate picture. Here the coordinates xv and yv are calculated according to the following equations (1-1) and (1-2):

$$xv = xi \times xr + (wr/2) \quad (1\text{-}1)$$

$$yv = yi \times yr + (hr/2) \quad (1\text{-}2)$$

Based on the foregoing relationship between feature points 211 and 221 in FIG. 7, a pixel 222 in the candidate picture 220 is mapped onto the central point of the key picture 210. The image recognition unit 123 then casts a vote for the pixel 222 using a voting map 114. This voting map 114 is a collection of entries corresponding to individual pixels in the candidate picture 220. Each entry has an initial value of zero. FIG. 7 illustrates an example of a voting action with the voting map 114, in which the image recognition unit 123 increments the entry corresponding to the pixel 222 by one (step S23).

The image recognition unit 123 may actually cast multiple votes for the pixels within a specified area (e.g., a square area with dimensions of 10 pixels by 10 pixels) around the pixel 222. This option provides a certain level of robustness against difference between the key picture 210 and candidate picture 220.

Figure 8:
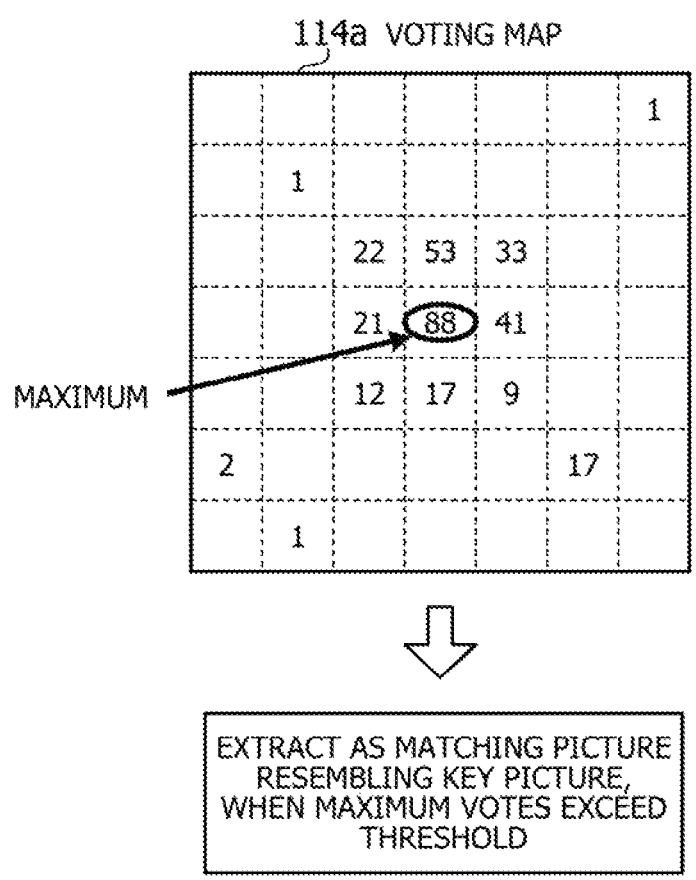
FIG. 8 explains how a matching picture is determined from voting results.

FIG. 8 explains how a matching picture is determined from voting results. Specifically, FIG. 8 illustrates a voting map 114a that expresses the final state of the foregoing voting map 114 of FIG. 7 after the voting is performed at every feature point in the key picture 210. The image recognition unit 123 searches this voting map 114a to find out which pixel has the largest number of votes and whether that maximum exceeds a specified threshold.

When both the key picture 210 and candidate picture 220 contain images of the same object as in FIG. 7, many of the matching points in the candidate picture 220 are found at the same relative positions as their corresponding feature points in the key picture 210. The voting map 114a is therefore expected to have concentrated votes in a few pixel entries as seen in FIG. 8. When, on the other hand, the candidate picture 220 was unrelated to the key picture 210, many of the relative positions of matching points in the candidate picture 220 would be unlike those of feature points in the key picture 210. In this case, the votes would exhibit a widely scattered distribution across the resulting voting map 114a.

Referring to the example of FIG. 8, the maximum number of votes in the voting map 114a exceeds a threshold. This fact suggests that votes are concentrated into a particular pixel, and that the key picture 210 and candidate picture 220 are likely to contain images of the same object. Accordingly, the image recognition unit 123 concludes that the candidate picture 220 resembles the key picture 210 when the maximum number of votes exceeds the threshold.

The above-noted maximum number of votes actually depends on the number of feature points defined in the candidate picture 220. For this reason, it is preferable to normalize the numbers of votes cast for individual pixels by, for example, dividing them by the number of feature points in the candidate picture 220 before they are compared with the threshold.

c) Detailed Calculation of Binary Feature Values

Local feature value is expressed in the form of a string of bit values. As mentioned in the preceding section, pixel pairs may be assigned a bit value of "1" for positive luminance differences and "0" for zero or negative luminance differences. This sign-based binarization method may, however, generate problematic binary feature values that would lead to false detection of matching points. More will be discussed below with reference to FIG. 9.

Figure 9:
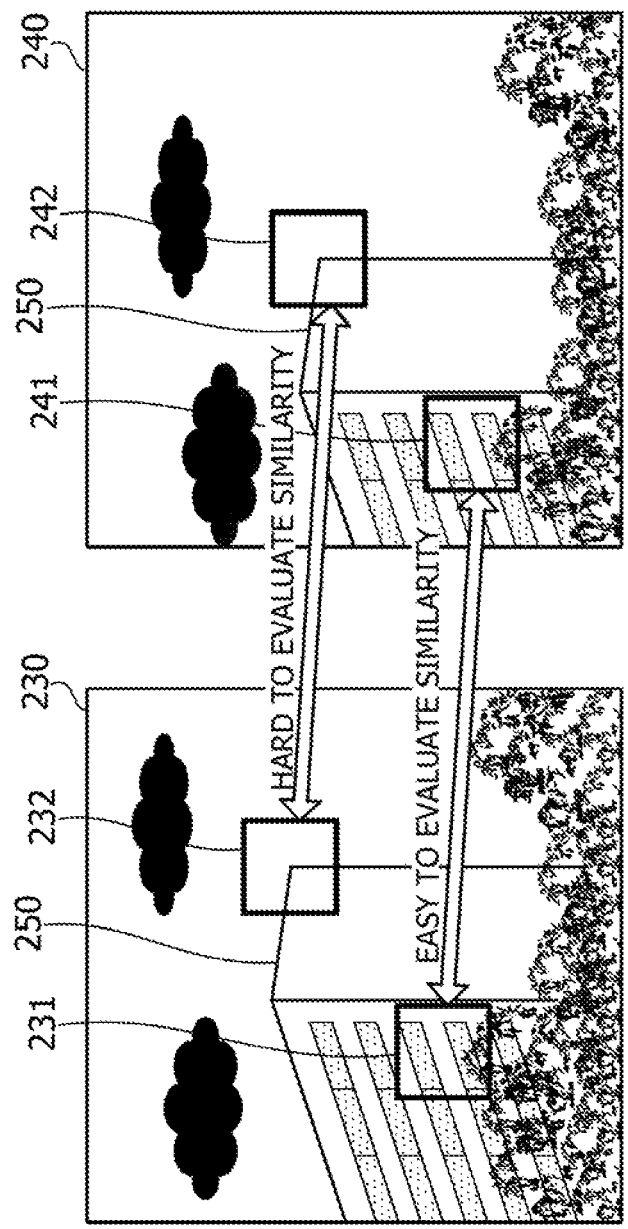
FIG. 9 illustrates an example of searching for matching points.

FIG. 9 illustrates an example of searching for matching points. Both illustrated pictures 230 and 240 in FIG. 9 have images of a specific architecture 250, photographed from different angles and at different distances. What is seen in a feature area 231 in the left picture 230 (and feature area 241 in the right picture 240 alike) is a part of outer window surfaces of the architecture 250. What is seen in another feature area 232 in the left picture 230 (and feature area 242 in the right picture 240 alike) is, on the other hand, a boundary between one of the planar walls of the architecture 250 and the sky in the background. This means that the latter feature areas 232 and 242 are relatively flat and monotonous when compared with the former feature areas 231 and 241.

As can be seen from FIG. 9, two feature areas 231 and 241 have a close resemblance, and the latter feature area 241 is thus qualified as a matching area resembling the former feature area 231. Also, another two feature areas 232 and 242 have a close resemblance, and the latter feature area 242 is thus qualified as a matching area resembling the former feature area 232.

Many pixel pairs in the first two feature areas 231 and 241 have large luminance differences, and these luminance differences are unlikely to change their signs in spite of variations of light source intensity and noise disturbance. Even the aforementioned sign-based binarization method could make stable determination of bit values in spite of ever varying shooting conditions. For this reason, the feature area 241 is expected to qualify as a matching area resembling the feature area 231.

In contrast to the above, the majority of pixel pairs in the second two feature areas 232 and 242 have almost no luminance differences because of the flatness or monotonicity of their images. Even a small difference in light source conditions or noise levels may cause the luminance differences to change their signs. This means that the foregoing sign-based binarization method is unable to make stable determination of bit values. The local feature values would fluctuate as the shooting conditions change. In other words, the noted sign-based binarization method is likely to fail in extracting the feature area 242 as a matching area corresponding to the key-picture feature area 232, thus worsening the accuracy of image recognition.

Figure 10:
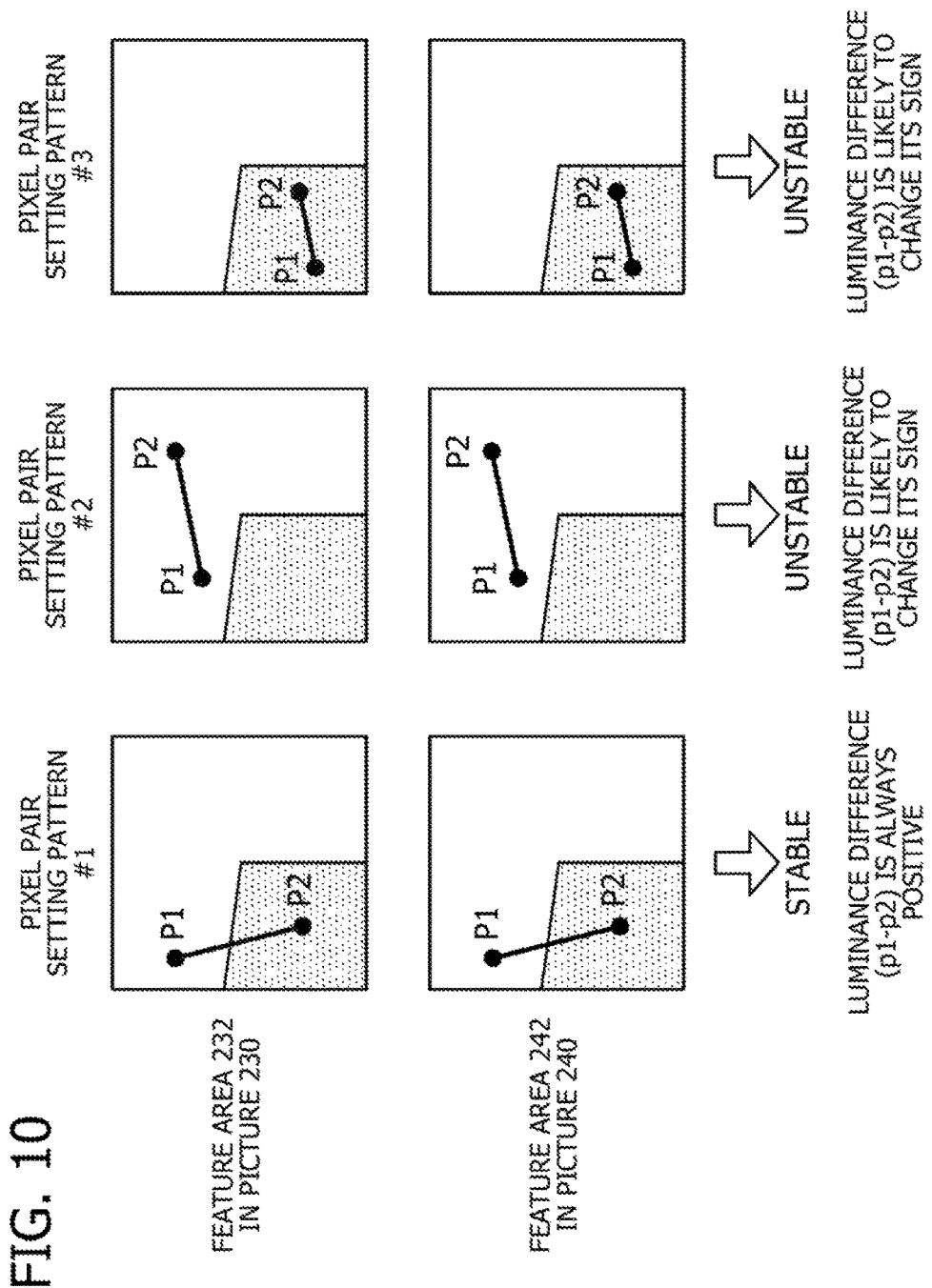
FIG. 10 illustrates several examples of pixel pair setting in feature areas.

FIG. 10 illustrates several examples of pixel pair setting in feature areas. Specifically, FIG. 10 provides three pixel pair setting patterns #1 to #3 in two feature areas 232 and 242 previously discussed as part of pictures 230 and 240 in FIG. 9. The hatched portion of each feature area 232 and 242 represents a wall surface of the architecture 250 in FIG. 9, and the remaining portions represent the sky as a background. The background part appears brighter than the wall surface part, which makes a perceptible difference in luminance.

Referring first to setting pattern #1, pixel P1 is in the background part, while pixel P2 is in the wall surface part. While the light sources and noise levels may vary depending on the shooting conditions in which pictures are taken, the difference between luminance value p1 at pixel P1 and luminance value p2 at pixel P2 is always positive, thus resulting in a bit value of "1." This bit value "1" is unlikely to change. The sign-based binarization method stably generates binary feature values in this case.

Referring next to setting pattern #2, both pixels P1 and P2 are in the background part, and their luminance values p1 and p2 at pixels P1 and P2 have little difference. As noted above, the light sources and noise levels may vary depending on the shooting conditions, and such variations immediately affect the sign of luminance difference (p1−p2). It is thus uncertain whether the sign-based binarization method would output "0" or "1" for the bit value of pixel pair (P1, P2). This introduces instability into the resulting binary feature values.

Referring to setting pattern #3, both pixels P1 and P2 are in the wall surface part. This situation is similar to the above setting pattern #2. That is, the two luminance values p1 and p2 have little difference, thus introducing instability into the resulting binary feature values.

Pictures may include feature areas that lack variations in luminance. In such monotonous feature areas, more pixel pairs are like the ones discussed above in setting patterns #2 and #3, rather than the one discussed in setting #1. In other words, the majority of pixel pairs are uncertain in the sign-based binarization because their luminance differences are likely to change the signs as in the case of setting patterns #2 and #3. The resulting binary feature values are sensitive to shooting conditions and lack the stability against variations in the surroundings. This would deprive the image recognition unit 123 of its accuracy.

FIG. 11 illustrates an example of a histogram of luminance differences between paired pixels. Specifically, FIG. 11 illustrates distribution of luminance differences calculated from a large number of pictures, including ordinary photographs, images in business documents, and CT scan images. As can be seen in FIG. 11, the luminance differences tend to concentrate into a near-zero range (i.e., the zero point and its surroundings) in the histogram. That is, the binary feature values extracted from such pictures tend to produce many pixel pairs with almost no luminance differences. This fact has a considerable negative effect on the accuracy of image recognition.

In view of the above, the present embodiment displaces the threshold, or the binarization boundary for luminance differences, away from the zero point. That is, the feature value calculation unit 122 uses a non-zero threshold to determine whether to output "0" or "1" for given luminance differences, so as to make the bit values less dependent on the shooting conditions of pictures even if their images include pixel pairs with almost no luminance difference.

Figure 12:
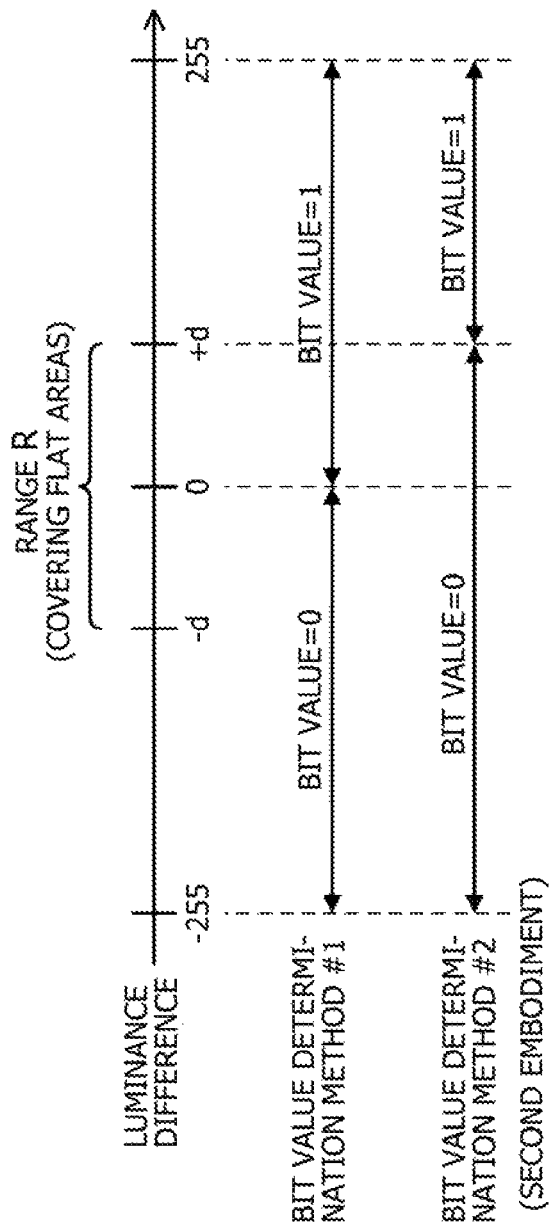
FIG. 12 illustrates an example of threshold setting for bit value determination.

FIG. 12 illustrates an example of threshold setting for bit value determination. Specifically, FIG. 12 presents bit value determination methods #1 and #2, where the latter (#2) is proposed in the second embodiment while the former (#1) is for comparison purposes. According to bit value determination method #1, the pixel pair in question is given a bit value of "1" when its luminance difference exceeds zero and a bit value of "0" when its luminance difference is zero or below.

Bit value determination method #2 according to the present embodiment uses a specified threshold d that is greater than zero and smaller than the maximum luminance value (e.g., 255 in FIG. 12). For example, the feature value calculation unit 122 gives a bit value of "1" to a pixel pair when its luminance difference is greater than the threshold d, and a bit value of "0" to the same when its luminance difference is equal to or smaller than the threshold d. This method #2 gives a fixed bit value of to pixel pairs whose luminance differences are close to zero and whose pixel locations are probably within a flat portion of the picture. Even if the shooting conditions may change, these pixel pairs would keep the same bit values in a stable manner. Bit value determination method #2 therefore discovers similar feature points more accurately, thus contributing to an improved accuracy of image recognition.

The feature value calculation unit 122 may be modified as to the handling of luminance differences between −d and +d. For example, the feature value calculation unit 122 may be configured to output a bit value of "1" when the luminance difference is equal to or greater than −d, and a bit value of "0" when the luminance difference is smaller than −d. Also, the feature value calculation unit 122 may be configured to output a bit value of "1," rather than "0," when the luminance difference is in the range R from −d to +d inclusive.

In other words, when the luminance difference its corresponding bit value to or When the luminance difference is outside the range R, the feature value calculation unit 122 uses the foregoing bit value determination method #1.

The threshold d may be prepared as an invariable value. Alternatively, the threshold d may dynamically be determined on the basis of statistical data about luminance differences of pixel pairs collected from source pictures. An example of the latter option will be described below with reference to FIG. 13.

Figure 13:
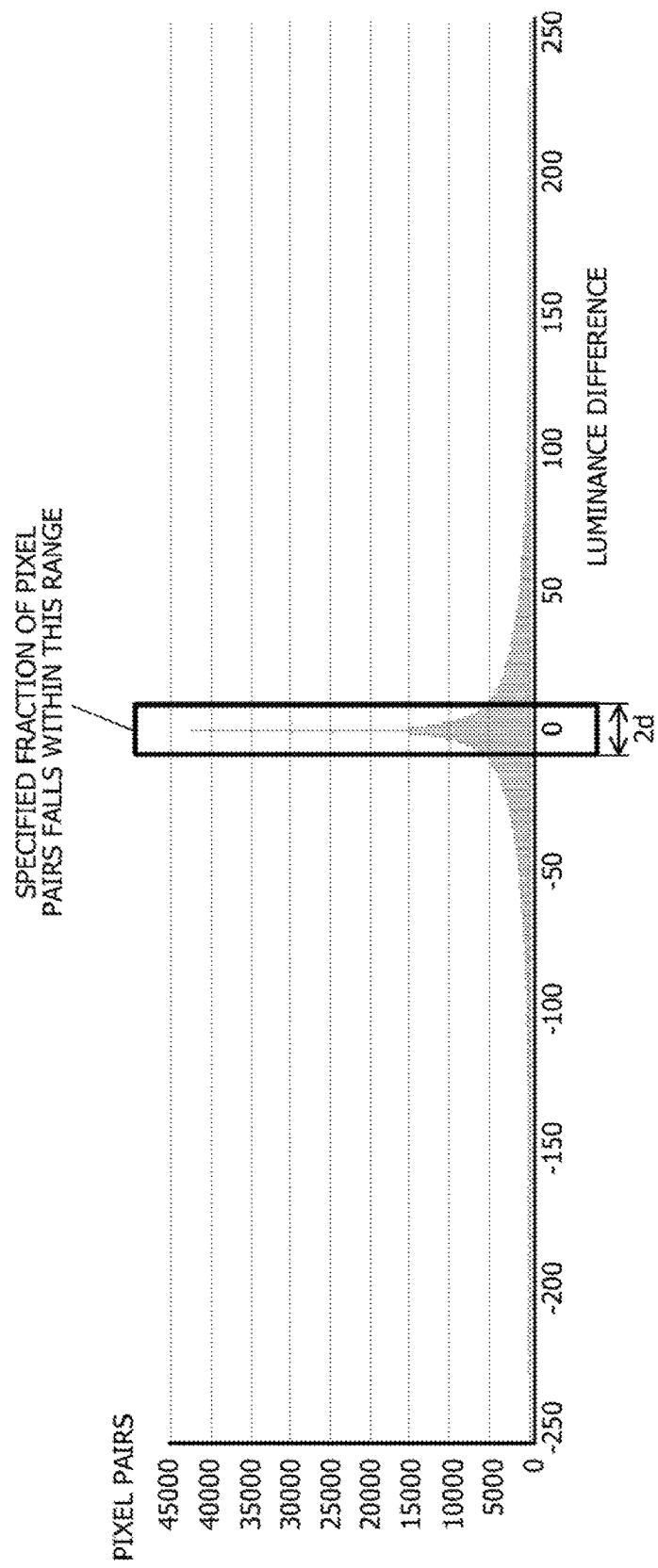
FIG. 13 illustrates an example of dynamic determination of thresholds.

FIG. 13 illustrates an example of dynamic determination of thresholds. Specifically, FIG. 13 depicts how a threshold d is determined by using the histogram of luminance differences discussed in FIG. 11.

For example, the feature value calculation unit 122 extracts a range of luminance differences from the histogram. This range covers a specified fraction (e.g., 50%) of collected instances of luminance differences, including zero-valued instances at its central position. The feature value calculation unit 122 sets a threshold d at the positive end of the extracted range. In other words, the threshold d is determined such that the width of the extracted range will be 2d.

The above method adaptively determines a binarization threshold d according to the statistics of source pictures actually used in an image recognition process. As another example, the feature value calculation unit 122 may be configured to specify a frequency threshold in the histogram of FIG. 13. That is, the feature value calculation unit 122 may extract a range around the zero point of luminance difference in which the statistical frequency (i.e., the number of pixel pairs) in the histogram is equal to or greater than the frequency threshold. The feature value calculation unit 122 then determines a binarization threshold d from the extracted range in the same way as in the above-described method.

The histogram of luminance differences is constructed by sampling and analyzing source pictures. These pictures (called "sample pictures") may be all or some of image datasets 111 stored in the storage unit 110. Alternatively, a dedicated set of sample pictures may be prepared for construction of histograms, separately from image datasets 111 in the storage unit 110.

The statistics-based threshold determination methods described above may only be used for the initial setup of binarization threshold d. Once the value of threshold d is determined, the same threshold d is used to calculate feature values of source pictures, including new source pictures added to the existing set. Alternatively, the threshold d may be changed following update of source pictures for image recognition. For example, the feature value calculation unit 122 may be configured to calculate a new threshold d at fixed intervals, using the latest set of source pictures.

d) Flowcharts

This section describes several processes executed by the image processing apparatus 100, with reference to the accompanying flowcharts.

Figure 14:
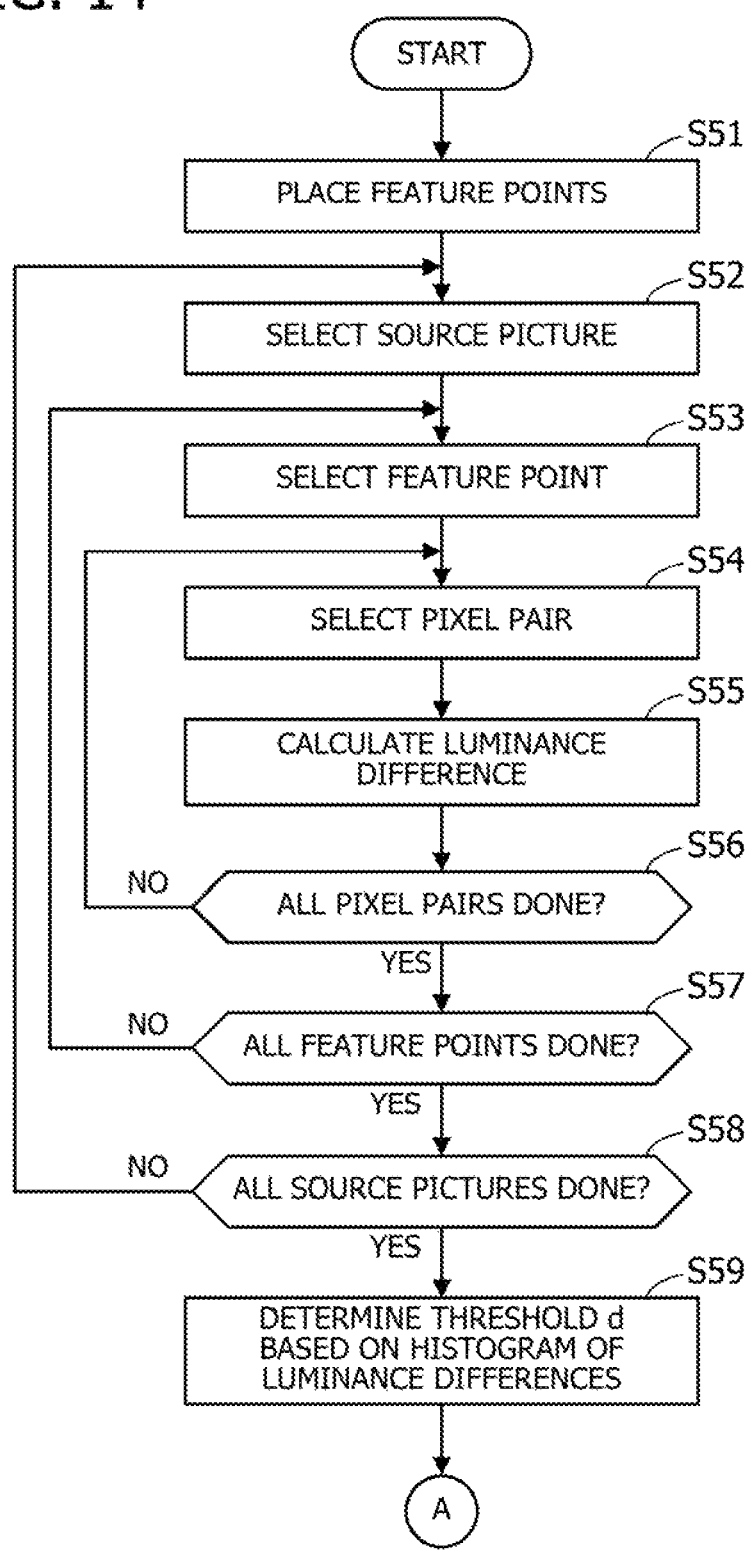
FIGS. 14 and 15 are a flowchart illustrating an example of how to calculate feature values.
Figure 15:
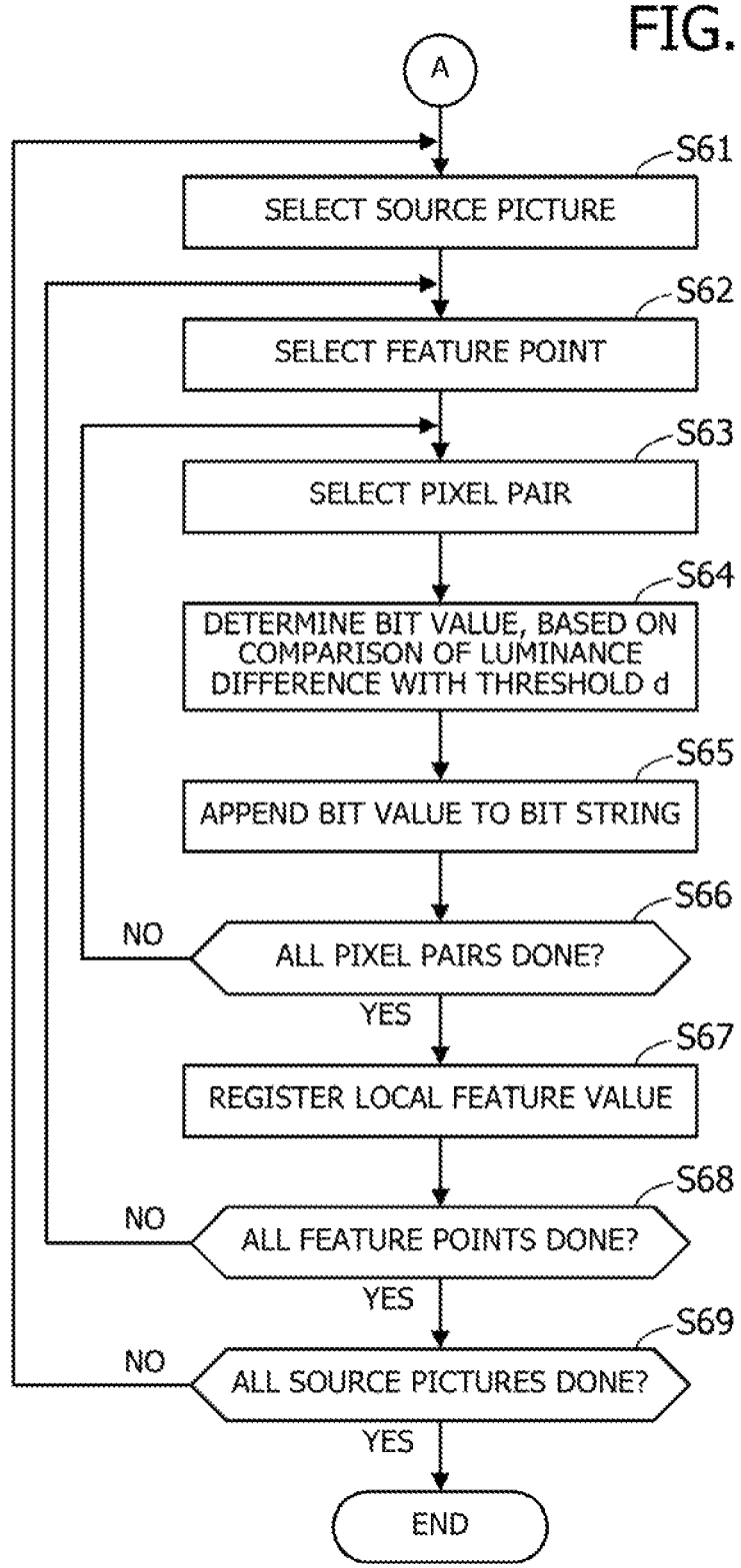

FIGS. 14 and 15 are a flowchart illustrating an example of how to calculate feature values. Each step of this flowchart is described below in the order of step numbers.

(Step S51) The feature value calculation unit 122 places multiple feature points on each source picture. For example, the feature value calculation unit 122 places feature points at equal grid intervals (e.g., every 24 pixels in each direction) according to the aforementioned dense sampling method. The feature value calculation unit 122 then constructs a feature value management table 113 for each source picture and generates records that describe individual feature points, including the ID and coordinates of each feature point.

(Step S52) The feature value calculation unit 122 selects one source picture.

(Step S53) The feature value calculation unit 122 selects one feature point out of those in the source picture selected in step S52.

(Step S54) The feature value calculation unit 122 selects one pixel pair from the pixel pair management table 112 (FIG. 4).

(Step S55) The feature value calculation unit 122 selects paired pixels corresponding the pixel pair selected in step S54 from a feature area around the feature point selected in step S53. The feature value calculation unit 122 then calculates a luminance difference between the selected paired pixels. More specifically, the pixel pair is formed from a first pixel and a second pixel, and its luminance difference is calculated by subtracting the second pixel's luminance value from the first pixel's luminance value.

(Step S56) The feature value calculation unit 122 determines whether it has finished with all pixel pairs registered in the pixel pair management table 112. When there are unprocessed pixel pairs, the feature value calculation unit 122 goes back to step S54 and selects a pixel pair for the next iteration. When all the registered pixel pairs are done, the feature value calculation unit 122 advances to step S57.

(Step S57) The feature value calculation unit 122 determines whether it has finished with all feature points in the source picture selected in step S52. When there are unprocessed feature points, the feature value calculation unit 122 goes back to step S53 and selects a feature point for the next iteration. When all feature points are done, the feature value calculation unit 122 advances to step S58.

(Step S58) The feature value calculation unit 122 determines whether it has finished with all source pictures. When there are unprocessed source pictures, the feature value calculation unit 122 goes back to step S52 and selects a source picture for the next iteration. When all source pictures are done, the feature value calculation unit 122 advances to step S59.

(Step S59) Using all luminance differences calculated in step S55, the feature value calculation unit 122 constructs a histogram that represents the distribution of luminance differences in terms of statistical frequency. The feature value calculation unit 122 then determines a threshold d on the basis of the constructed histogram. For example, the feature value calculation unit 122 extracts a range of luminance differences from the histogram. This range covers a specified fraction (e.g., 50%) of instances of luminance differences, including zero-valued instances at its central position. The feature value calculation unit 122 determines a threshold d by picking up a luminance difference value at the positive end of the extracted range.

While the above histogram is constructed by analyzing luminance differences in all source pictures, it is not intended to limit the second embodiment by that implementation. Step S59 may be modified to construct a histogram from some of the existing source pictures. In either case, the feature value calculation unit 122 may use only a partial image extracted from those source pictures. For example, the feature value calculation unit 122 may use only some of the feature areas defined in source pictures.

(Step S61) The feature value calculation unit 122 selects one source picture.

(Step S62) The feature value calculation unit 122 selects one feature point out of those in the source picture selected in step S61.

(Step S63) The feature value calculation unit 122 selects one pixel pair from the pixel pair management table 112 (FIG. 4).

(Step S64) The feature value calculation unit 122 determines a bit value for the pixel pair selected in step S63 by comparing its calculated luminance difference with the threshold d. For example, the feature value calculation unit 122 gives a bit value of "1" to the selected pixel pair when its luminance difference is greater than the threshold d, and a bit value of "0" to the selected pixel pair when its luminance difference is equal to or smaller than the threshold d.

(Step S65) The feature value calculation unit 122 constructs a bit string representing a local feature value at the feature point selected in step S62. Specifically, the feature value calculation unit 122 appends the bit value calculated in step S64 to the tail end of the noted bit string.

(Step S66) The feature value calculation unit 122 determines whether it has finished with all pixel pairs registered in the pixel pair management table 112. When there are unprocessed pixel pairs, the feature value calculation unit 122 goes back to step S63 and selects a pixel pair for the next iteration. When all the registered pixel pairs are done, the feature value calculation unit 122 advances to step S67.

(Step S67) The feature value calculation unit 122 registers the bit string constructed in step S65 by entering it to a pertinent record in a pertinent feature value management table 113 (FIG. 6). This bit string represents a local feature value of the feature point selected in step S62.

(Step S68) The feature value calculation unit 122 determines whether it has finished with all feature points in the source picture selected in step S61. When there are unprocessed feature points, the feature value calculation unit 122 goes back to step S62 and selects a feature point for the next iteration. When all feature points are done, the feature value calculation unit 122 advances to step S69.

(Step S69) The feature value calculation unit 122 determines whether it has finished with all source pictures. When there are unprocessed source pictures, the feature value calculation unit 122 goes back to step S61 and selects a source picture for the next iteration. When all source pictures are done, the feature value calculation unit 122 closes this process of feature value calculation.

The above processing steps of FIGS. 14 and 15 populate feature value management tables 113 with local feature values at feature points in the source pictures.

The above description of FIGS. 14 and 15 has assumed that the threshold d is dynamically determined on the basis of statistics of luminance differences. It is not intended, however, to limit the scope of embodiments by that assumption. For example, the threshold d may be a predetermined static value. In this alternative case, the feature value calculation unit 122 may be modified such that a bit value is determined in step S55 of FIG. 14 and a relevant feature value management table 113 is populated with the local feature value calculated for the selected feature point when step S56 has chosen the "YES" path. These modifications eliminate the need for step S59 and subsequent processing.

Figure 16:
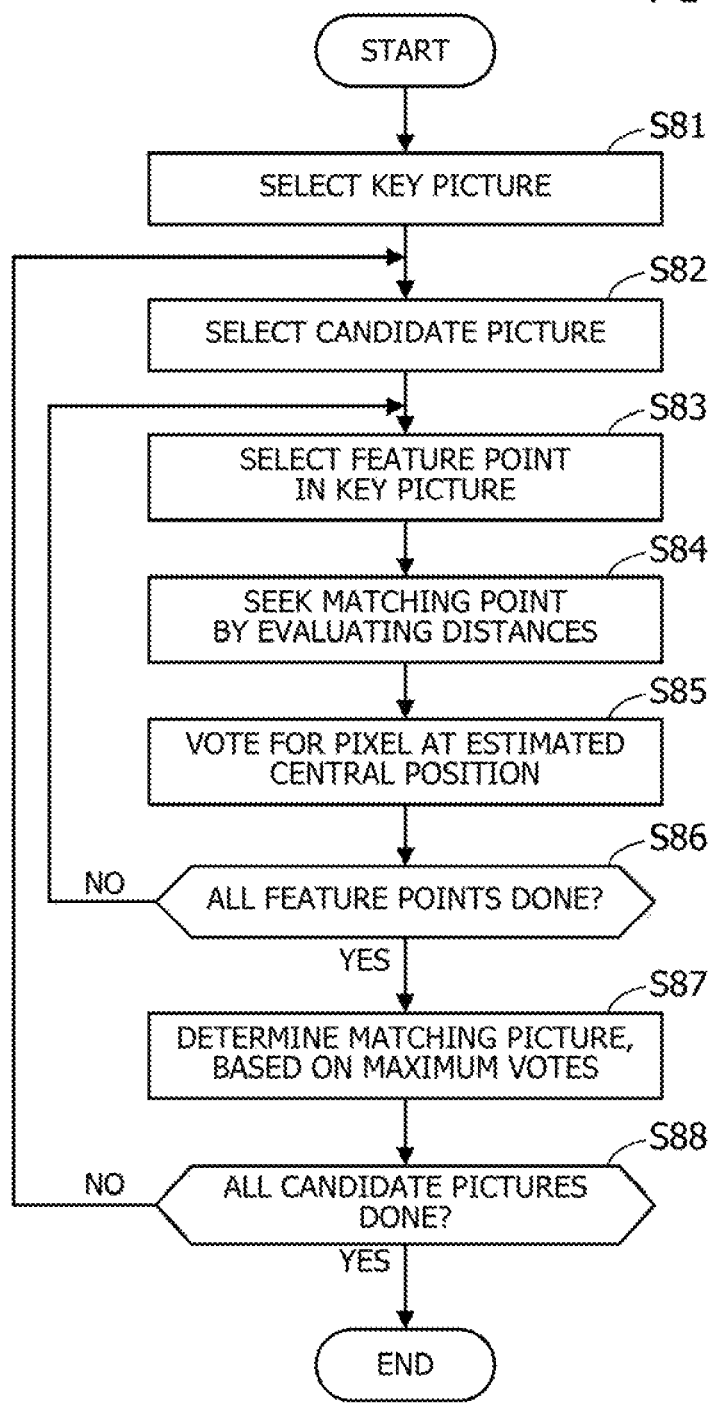
FIG. 16 is a flowchart illustrating an example of image recognition.

FIG. 16 is a flowchart illustrating an example of image recognition. Each step of this flowchart is described below in the order of step numbers.

(Step S81) The image recognition unit 123 selects a key picture from the source pictures in response to instructions entered by the user.

(Step S82) The rest of the source pictures (i.e., excluding the key picture) will now be evaluated as candidate pictures. The image recognition unit 123 selects one of those candidate pictures.

(Step S83) The image recognition unit 123 selects one feature point out of those in the key picture.

(Step S84) The image recognition unit 123 searches the candidate picture selected in step S82 to seek a feature point (matching point) that matches with the key picture's feature point selected in step S83. More specifically, the image recognition unit 123 calculates Hamming distance of local feature values between the selected feature point in the key picture and each individual feature point in the candidate picture. The image recognition unit 123 then determines which feature point in the candidate picture has the smallest Hamming distance to the key picture's feature point. The found minimum-distance feature point is extracted as a matching point since the smallest Hamming distance of local feature values suggests the closest resemblance.

(Step S85) The image recognition unit 123 estimates where in the candidate picture the center of the key picture will come when the key picture is overlaid on the candidate picture in such a way that the feature point selected in step S83 coincides with its matching point found in step S84. The image recognition unit 123 then casts a vote for the candidate picture's pixel at the estimated central position. The image recognition unit 123 may actually cast multiple votes for the pixels within a specified area (e.g., a square area with sides of 10 pixels) around the estimated central position.

(Step S86) The image recognition unit 123 determines whether it has finished with all feature points in the key picture. When there are unprocessed feature points, the image recognition unit 123 goes back to step S83 and selects a feature point for the next iteration. When all feature points are done, the image recognition unit 123 advances to step S87.

(Step S87) The image recognition unit 123 determines which pixel in the candidate picture selected in step S82 has the largest number of votes. If the number of votes exceeds a specified threshold, it means that the currently selected candidate picture qualifies as a matching picture corresponding to the key picture. When this is the case, the image recognition unit 123 outputs the identifier of the selected candidate picture. Otherwise, the image recognition unit 123 disqualifies the selected candidate picture from being a matching picture.

It is note that step S87 may be modified to accumulate all candidate pictures whose maximum votes exceed the threshold, so that their identifiers will be sent out in descending order of the number of votes.

(Step S88) The image recognition unit 123 determines whether it has finished with all candidate pictures. When there are unprocessed pictures, the image recognition unit 123 goes back to step S82 and selects a candidate picture for the next iteration. When all candidate pictures are done, the image recognition unit 123 closes this image recognition process after outputting the identifiers of matching pictures that step S87 has recognized their close resemblance to the key picture.

The above-described step S84 in FIG. 16 is able to find matching points accurately because of the use of feature values calculated by the process described in FIGS. 14 and 15. Consequently, step S87 enjoys improved accuracy in discovering matching pictures. As noted in FIG. 11, ordinary pictures have a large area of flat and monotonous image. This tendency leads to increased percentage of pixel pairs with almost no luminance differences when those pictures are subjected to calculation of local feature values. The method described in FIGS. 14 and 15 ensures that such pixel pairs with little luminance difference obtain a bit value of "0" without fluctuations, thus contributing to improvement of accuracy in image recognition.

e) Variation of Second Embodiment

This section describes a variation of the foregoing image processing apparatus 100 of the second embodiment. The difference is that multiple thresholds d are defined for use with different pixel pairs in a feature area. When determining a bit value as part of a local feature value, the variation of the second embodiment uses one of those thresholds d depending on the pixel pair corresponding to the bit value in question.

The variation is implemented on an image processing apparatus having the same hardware configuration discussed in FIG. 2 and having the same basic processing functions discussed in FIG. 3. Thus the following description will use the reference numerals used in FIGS. 2 and 3. The exception is that the storage unit 110 stores therein a modified pixel pair management table as seen in FIG. 17, instead of the foregoing pixel pair management table 112 in FIGS. 3 and 4.

FIG. 17 illustrates another example of a pixel pair management table. Unlike the foregoing pixel pair management table 112 in FIG. 4, this pixel pair management table 112a in FIG. 17 has an additional data field to store the values of threshold d. This additional data field permits each different pixel pair to have its own threshold d.

Figure 18:
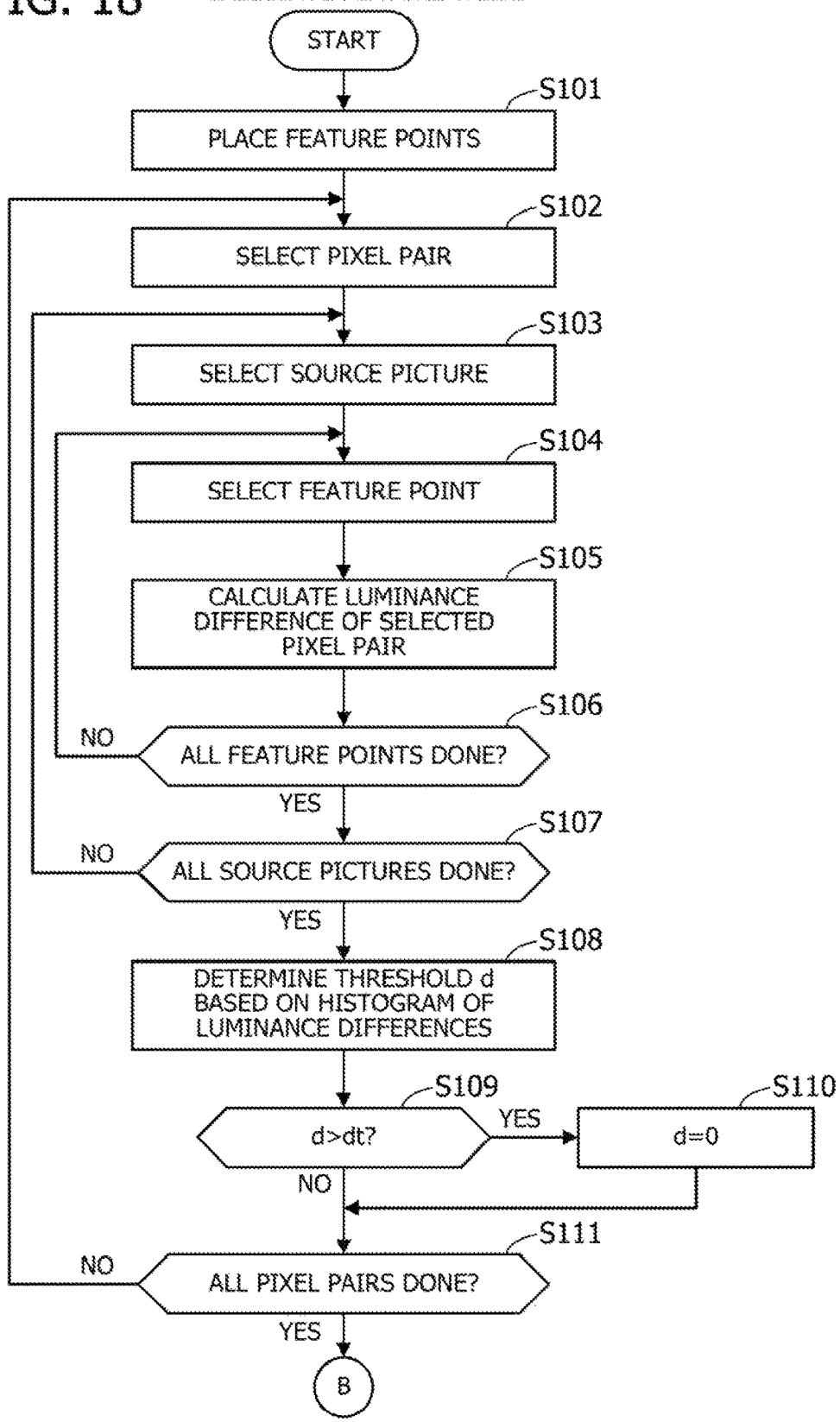
FIGS. 18 and 19 are a flowchart illustrating an example of how an image processing apparatus calculates feature values.
Figure 19:
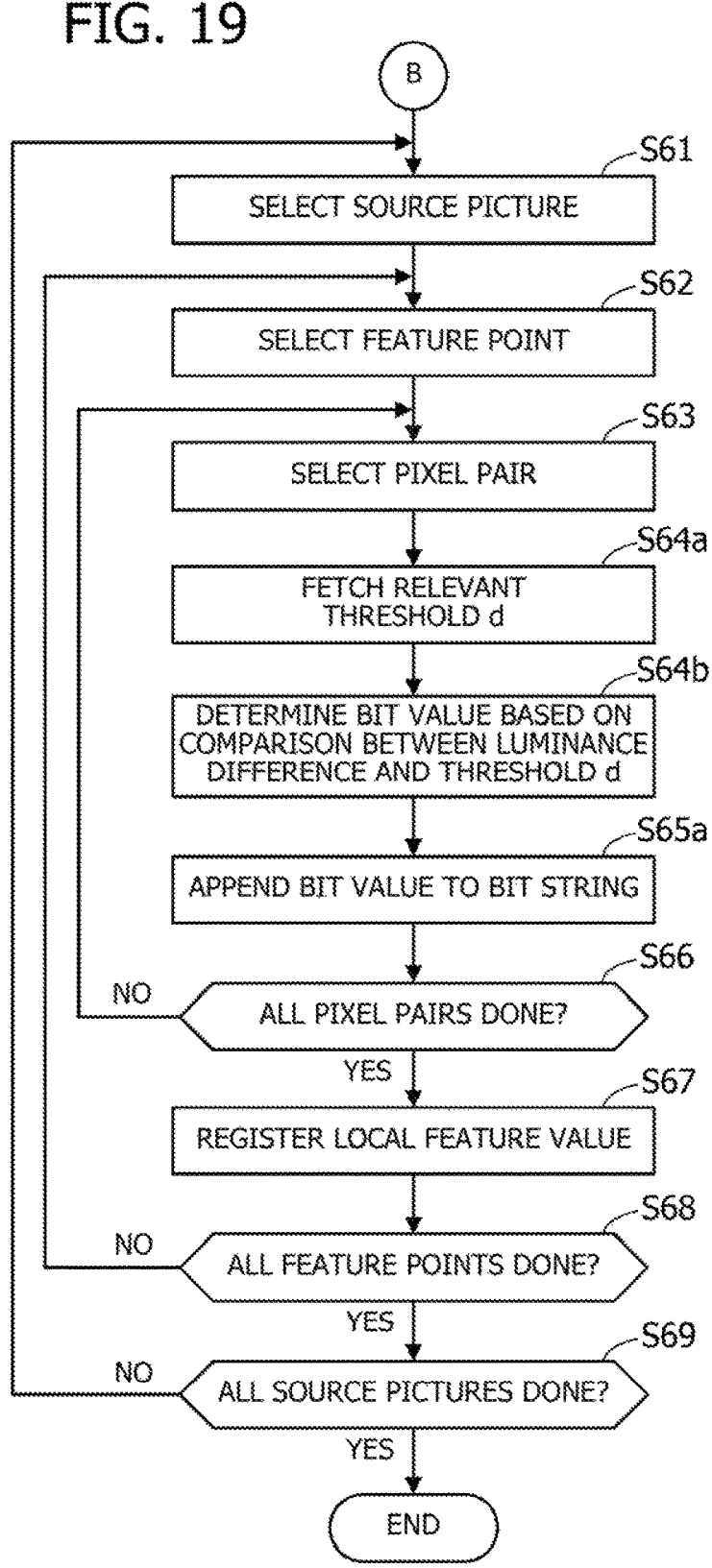

FIGS. 18 and 19 are a flowchart illustrating an example of how an image processing apparatus calculates feature values. Each step of this flowchart is described below in the order of step numbers.

(Step S101) The feature value calculation unit 122 places feature points on each source picture in the same way as in step S51 of FIG. 14. The feature value calculation unit 122 then constructs a feature value management table 113 for each source picture and generates records that describe individual feature points, including the ID and coordinates of each feature point.

(Step S102) The feature value calculation unit 122 selects one pixel pair from the pixel pair management table 112 (FIG. 4).

(Step S103) The feature value calculation unit 122 selects one source picture.

(Step S104) The feature value calculation unit 122 selects one feature point out of those in the source picture selected in step S103.

(Step S105) The feature value calculation unit 122 selects paired pixels corresponding the pixel pair selected in step S102 from a feature area defined around the feature point selected in step S104. The feature value calculation unit 122 then calculates a luminance difference of the selected paired pixels. More specifically, the pixel pair is formed from a first pixel and a second pixel, and its luminance difference is calculated by subtracting the second pixel's luminance value from the first pixel's luminance value.

(Step S106) The feature value calculation unit 122 determines whether it has finished with all feature points in the source picture selected in step S103. When there are unprocessed feature points, the feature value calculation unit 122 goes back to step S104 and selects a feature point for the next iteration. When all feature points are done, the feature value calculation unit 122 advances to step S107.

(Step S107) The feature value calculation unit 122 determines whether it has finished with all source pictures. When there are unprocessed source pictures, the feature value calculation unit 122 goes back to step S103 and selects a source picture for the next iteration. When all source pictures are done, the feature value calculation unit 122 advances to step S108.

(Step S108) Above step S105 has calculated luminance differences from all source pictures, with respect to the particular pixel pair selected in step S102. Using these luminance differences, the feature value calculation unit 122 constructs a histogram that represents the distribution of luminance differences in terms of statistical frequency. Based on this histogram, the feature value calculation unit 122 determines a threshold d for the currently selected pixel pair. For example, the feature value calculation unit 122 extracts a range of luminance differences from the histogram. This range covers a specified fraction (e.g., 50%) of instances of luminance differences, including zero-valued instances at its central position. The feature value calculation unit 122 determines a threshold d by picking up a luminance difference value at the positive end of the extracted range.

(Step S109) The feature value calculation unit 122 determines whether the threshold d determined in step S108 is greater than a specified threshold dt. The latter threshold dt is greater than zero and smaller than the maximum luminance value (e.g., 255). When d>dt, the feature value calculation unit 122 executes step S110. Otherwise, the feature value calculation unit 122 registers the former threshold d in the pixel pair management table 112a by entering d to the record corresponding to the selected pixel pair. The process then moves to step S111.

(Step S110) The feature value calculation unit 122 changes the threshold d to zero, thus canceling the outcome of step S108. The feature value calculation unit 122 registers the changed threshold d in the pixel pair management table 112a by entering zero to the record corresponding to the selected pixel pair.

When d>dt (i.e., when step S109 takes the "YES" path), it means the lack of concentration of luminance differences in the near-zero range of the histogram. It is unlikely in this case that the luminance difference of the selected pixel pair falls within the near-zero range of the histogram. Accordingly, the feature value calculation unit 122 sets the threshold d to zero, so that the foregoing bit value determination method #1 (i.e., sign-based method) discussed in FIG. 12 will be applied to the selected pixel pair. This operation reduces the computational load of bit value determination for the selected pixel pair.

(Step S111) The feature value calculation unit 122 determines whether it has finished with all pixel pairs registered in the pixel pair management table 112a. When there are unprocessed pixel pairs, the feature value calculation unit 122 goes back to step S102 and selects a pixel pair for the next iteration. When all the registered pixel pairs are done, the feature value calculation unit 122 advances to the continued process seen in FIG. 19.

The illustrated process of FIG. 19 is similar to what has been discussed in FIG. 15, except that steps S64 and S65 have been replaced with steps S64a, S64b, and S65a. The following description will therefore focus upon the operation in steps S64a, S64b, and S65a. For the other steps, see the previous description of FIG. 15.

(Step S64a) With reference to the pixel pair management table 112a, the feature value calculation unit 122 fetches a relevant threshold d from the record corresponding to the pixel pair selected in step S63.

(Step S64b) The feature value calculation unit 122 determines a bit value for the pixel pair selected in step S63 by comparing its luminance difference with the threshold d fetched in step S64a. For example, the feature value calculation unit 122 gives a bit value of "1" to the selected pixel pair when its luminance difference is greater than the threshold d, and a bit value of "0" to the selected pixel pair when its luminance difference is equal to or smaller than the threshold d.

(Step S65a) The feature value calculation unit 122 constructs a bit string representing a local feature value at the feature point selected in step S62. Specifically, the feature value calculation unit 122 appends the bit value calculated in step S64b to the tail end of the noted bit string.

The above-described variation of the second embodiment provides advantages described below. Each pixel pair in a feature area has first and second pixels, and the locations of these pixels are different from pair to pair. Pixel pairs are also unique in the relative positions of their first and second pixels. For these reasons, the optimal threshold d for bit value determination may be different from pair to pair. According to the above-described variation, luminance differences are collected from feature areas in various source pictures on an individual pixel pair basis, and a threshold d is calculated for each different pixel pair on the basis of the statistics of luminance difference. This approach optimizes the thresholds d and thus stabilizes the calculation of local feature values in flat image areas against small variations of shooting conditions. The proposed techniques make it possible to discover similar feature points more accurately and thus achieve an improved accuracy of image recognition.

(C) Third Embodiment

Figure 20:
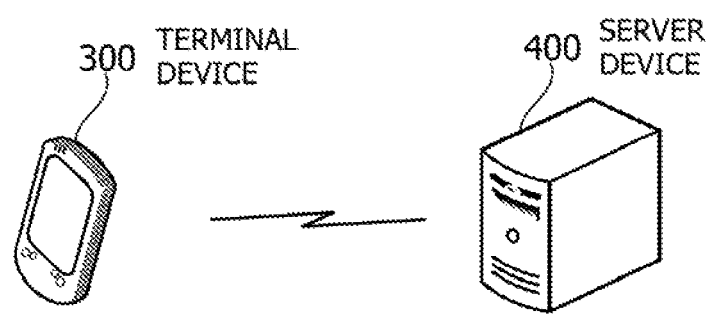
FIG. 20 illustrates an example of an image processing system according to a third embodiment.

FIG. 20 illustrates an example of an image processing system according to a third embodiment. The illustrated image processing system is formed from a terminal device 300 and a server device 400.

The terminal device 300 may be, for example, a cellular phone, smart phone, digital camera, personal computer, or the like. Besides being able to access the server device 400 via a network, the terminal device 300 has the function of taking pictures and calculating their feature values. The terminal device 300 sends these pictures to the server device 400, together with their feature values.

The server device 400 accumulates pictures sent from the terminal device 300. The server device 400 has the function of extracting a pair of matching pictures from the stored pictures. Specifically, the server device 400 performs an image recognition process using feature values received together with the pictures.

For example, the above-described image processing system may be used to provide a photograph management service. This service allows the user to manage his or her own photographs, not with his or her local terminal device 300, but with a remote server device 400. Besides accumulating pictures, the server device 400 offers some additional capabilities such as discovering similar pictures and tagging pictures if they contain images of some identical objects.

Figure 21:
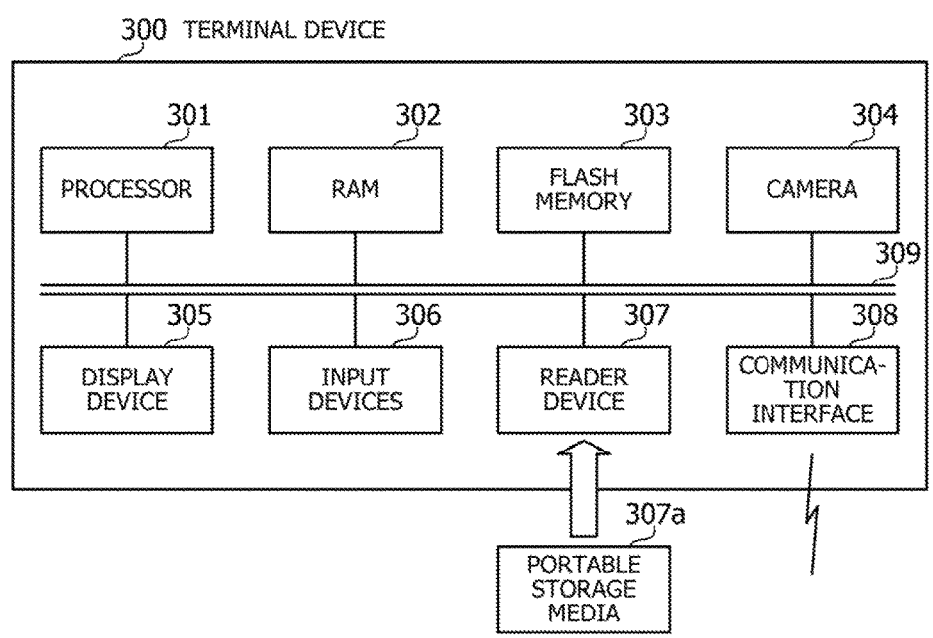
FIG. 21 illustrates an example of a hardware configuration of a terminal device.

FIG. 21 illustrates an example of a hardware configuration of a terminal device. The illustrated terminal device 300 has a processor 301 to control its entire operation. The processor 301 may be a single processing device or a multiprocessor system including two or more processing devices. The processor 301 may be implemented as, for example, a CPU, MPU, DSP, ASIC, or PLD, or any combination of them.

The processor 301 is connected to a RAM 302 and other various peripheral devices and interfaces on a bus 309. The RAM 302 serves as the primary storage device of the terminal device 300. Specifically, the RAM 302 is used to temporarily store at least some of the OS programs and application programs that the processor 301 executes, as well as other various data objects that the processor 301 manipulates at runtime.

Other devices on the bus 309 include a flash memory 303, a camera 304, a display device 305, input devices 306, a reader device 307, and a communication interface 308.

The flash memory 303 serves as a secondary storage device in the terminal device 300 to store OS program files and application program files, as well as various data files. Other possible secondary storage devices include HDDs and non-volatile memory devices.

The display device 305 displays still or video images in accordance with drawing commands from the processor 301. For example, the display device 305 may be a liquid crystal display or an OEL display.

The input devices 306 sends input signals to the processor 301 according to operations by the user. The input devices 306 include, for example, keyboards and pointing devices. Pointing devices include a mouse, touchscreen, tablet, touchpad, and trackball.

The reader device 307 is an interface for portable storage media 307a, such as optical discs, magneto-optical discs, and semiconductor memory devices. Specifically, a portable storage medium 307a is attached to and detached from the reader device 307. The reader device 307 reads data out of the attached portable storage medium 307a and sends it to the processor 301.

The communication interface 308 is connected to a network to exchange data with other devices (e.g., server device 400).

The above-described hardware platform in FIG. is used to implement the processing functions of the terminal device 300. Although not explicitly illustrated, the server device 400 may be implemented as a computer having the same hardware configuration as the image processing apparatus 100 discussed in FIG. 2.

FIG. 22 is a block diagram illustrating an example of processing functions provided by a terminal device and a server device. FIG. 22 actually includes some elements discussed in FIG. 3. The following description of FIG. 22 uses the same reference numerals as in FIG. 3 for these elements, but does not repeat the explanation for them.

The illustrated terminal device 300 includes a storage unit 310, an imaging unit 321, a feature value calculation unit 322, and a sending unit 323. The storage unit 310 is implemented as part of storage space of a storage device (e.g., RAM 302 or flash memory 303 in FIG. 21) in the terminal device 300. Specifically, the storage unit 310 stores therein image datasets 111, a pixel pair management table 112, and feature value management tables 113 as in FIG. 3. Image datasets 111 are a collection of picture data captured with the imaging unit 321.

The imaging unit 321, feature value calculation unit 322 and sending unit 323 provide processing functions described below. These functions may be implemented by, for example, causing the processor 301 to execute their corresponding software programs.

The imaging unit 321 captures images by controlling a camera 304 (FIG. 21) and stores the captured images into the storage unit 310. The stored images are in the form of image datasets 111.

The feature value calculation unit 322 in FIG. operates similarly to the feature value calculation unit 122 in FIG. 3. That is, the feature value calculation unit 322 calculates local feature values at individual feature points in source pictures, with reference to the image datasets 111 and pixel pair management table 112. The feature value calculation unit 322 then populates feature value management tables 113 with the calculated local feature values. Here the variation discussed in FIGS. 18 and 19 may be applied to this feature value calculation unit 322, so that it will calculate local feature values in the same way as the foregoing variation does.

The sending unit 323 sends each image dataset 111 from the storage unit 310 to the server device 400, together with feature value data recorded in the feature value management table 113.

The server device 400, on the other hand, includes a storage unit 410, a receiving unit 421, and an image recognition unit 422. The storage unit 410 is implemented as part of storage space of a storage device in the server device 400. The storage unit 410 stores therein image datasets 111 received from the terminal device 300, as well as their corresponding feature value data. For example, the storage unit 410 stores therein the received feature value data in the same format as the feature value management tables 113 in the terminal device 300. It is not intended, however, to limit the scope of the third embodiment by this example in FIG. 22.

The receiving unit 421 and image recognition unit 422 provide processing functions described below. These functions may be implemented by, for example, causing a processor (not depicted) of the server device 400 to execute their corresponding programs.

The receiving unit 421 receives image datasets 111 and their corresponding feature value data from the terminal device 300. Besides storing the received image datasets 111 into the storage unit 410, the receiving unit 421 registers the received feature value data in feature value management tables 113 in the storage unit 410.

The image recognition unit 422 in FIG. 22 works similarly to the image recognition unit 123 in FIG. 3. That is, the image recognition unit 422 accepts a selection of a key picture out of the stored pictures and searches the rest of them to discover matching pictures that resemble the selected key picture, with reference to the feature value management tables 113. The key picture may be chosen by the user, or may be selected automatically by the image recognition unit 422. In the latter case, the image recognition unit 422 may sequentially select key pictures from a pool of pictures stored in the storage unit 410.

The above-described third embodiment causes the terminal device 300 to calculate local feature values of pictures. Local feature values are each a collection of bit values, and the terminal device 300 assigns zeros to these bit values for the pixel pairs whose luminance differences fall within a near-zero range. The local feature values calculated in this way will permit the server device 400 to perform an image recognition process with an improved accuracy.

Three embodiments have been described above. The proposed processing functions of the image processing apparatuses 1 and 100, terminal device 300, and server device 400 may be implemented on a computer platform. The process steps of such an apparatus or device are encoded in a computer program, and a computer executes the program to provide its intended functions. Such programs may be recorded in computer-readable storage media, which include magnetic storage devices, optical discs, magneto-optical storage media, and semiconductor memory devices. Magnetic storage devices include, for example, hard disk drives (HDD), flexible disks (FD), and magnetic tapes. Optical disc media include, for example, digital versatile discs (DVD), DVD-RAM, compact disc read-only memory (CD-ROM), CD-Recordable (CD-R), and CD-Rewritable (CD-RW). Magneto-optical storage media include magneto-optical discs (MO), for example.

Portable storage media, such as DVD and CD-ROM, are used for distribution of program products. Network-based distribution of computer programs may also be possible, in which case several master program files are made available on a server computer for downloading to other computers via a network.

For example, a computer has programs in its local storage device, which were previously installed from a portable storage medium or downloaded from a server computer. The computer executes programs read out of the local storage device, thereby performing the programmed functions. Where appropriate, the computer may execute program code read out of a portable storage medium, without installing them in a local storage device. Alternatively, the computer may dynamically download programs from a server computer as needed and executes them upon delivery.

Several embodiments and their variations have been discussed above. In one aspect, the proposed techniques improve the way of calculating feature values, so that the similarity between feature areas is determined correctly.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a program that causes a computer to perform a procedure comprising:

calculating luminance differences of individual pixel pairs defined in a feature area in a source picture, the luminance differences each being a difference in luminance between pixels constituting a corresponding one of the pixel pairs;

calculating a local feature value of the feature area, based on the calculated luminance differences of the individual pixel pairs, the local feature value being a collection of bit values respectively corresponding to the individual pixel pairs, wherein the calculating of the local feature value includes:

comparing a specific luminance difference with a specified range between a lower bound and an upper bound, the specified range including a zero point of luminance difference, the specific luminance difference having been calculated for a specific pixel pair corresponding to a specific bit value in the local feature value, assigning a first value to the specific bit value when the specific luminance difference is greater than the upper bound of the specified range, assigning a second value to the specific bit value when the specific luminance difference is smaller than the lower bound of the specified range, and assigning a predetermined one of the first and second values to the specific bit value when the specific luminance difference falls in the specified range; and defining the specified range, based on distribution of luminance differences of pixel pairs placed in one or more sample pictures at identical positions as in the source picture.

2. The non-transitory computer-readable storage medium according to claim 1, wherein the defining of the specified range includes:

constructing a histogram of luminance differences of the pixel pairs placed in the one or more sample pictures; and determining the specified range as a range around a zero point of the histogram, such that a specified fraction of all instances of luminance differences in the histogram fall within the specified range.

3. The non-transitory computer-readable storage medium according to claim 1, wherein:

the specified range is provided in plurality, respectively defined for the individual pixel pairs; and the comparing uses one of the plurality of specified ranges that is defined for the specific pixel pair corresponding to the specific bit value.

4. The non-transitory computer-readable storage medium according to claim 1, wherein the procedure further comprises:

determining a matching area in another source picture, based on comparison of the local feature value of the feature area in the source picture with local feature values of feature areas in said another source picture, the matching area being one of the feature areas in said another source picture and resembling the feature area in the source picture.

5. An image processing apparatus comprising:

a memory configured to store a source picture having a feature area in which pixel pairs are defined; and a processor coupled to the memory and configured to execute a process including:

calculating luminance differences of the individual pixel pairs in the feature area, the luminance differences each being a difference in luminance between pixels constituting a corresponding one of the pixel pairs;

calculating a local feature value of the feature area, based on the calculated luminance differences of the individual pixel pairs, the local feature value being a collection of bit values respectively corresponding to the individual pixel pairs, wherein the calculating of the local feature value includes:

comparing a specific luminance difference with a specified range between a lower bound and an upper bound, the specified range including a zero point of luminance difference, the specific luminance difference having been calculated for a specific pixel pair corresponding to a specific bit value in the local feature value, assigning a first value to the specific bit value when the specific luminance difference is greater than the upper bound of the specified range, assigning a second value to the specific bit value when the specific luminance difference is smaller than the lower bound of the specified range, and assigning a predetermined one of the first and second values to the specific bit value when the specific luminance difference falls in the specified range; and defining the specified range, based on distribution of luminance differences of pixel pairs placed in one or more sample pictures at identical positions as in the source picture.

* * * * *